US012766416B2

(12) United States Patent
Ito et al.

(10) Patent No.: US 12,766,416 B2
(45) Date of Patent: Oct. 20, 2026

(54) RECORDING MEDIUM AND INFORMATION PROCESSING DEVICE

(71) Applicant: SEGA CORPORATION, Tokyo (JP)

(72) Inventors: Manato Ito, Tokyo (JP); Yuya Kimura, Tokyo (JP); Hidetomo Totsuka, Tokyo (JP); Takumi Tempaku, Tokyo (JP); Taishi Yokoshima, Tokyo (JP); Naoki Fujiki, Tokyo (JP); Tatsuya Kubota, Tokyo (JP); Koji Otsuka, Tokyo (JP); Atsushi Saito, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 506 days.

(21) Appl. No.: 18/308,198

(22) Filed: Apr. 27, 2023

(65) Prior Publication Data

US 2023/0256342 A1 Aug. 17, 2023

Related U.S. Application Data

(63) Continuation of application No. PCT/JP2021/039724, filed on Oct. 28, 2021.

(30) Foreign Application Priority Data

Oct. 30, 2020 (JP) ................................ 2020-183253

(51) Int. Cl.
*A63F 13/65* (2014.01)
*A63F 13/216* (2014.01)

(52) U.S. Cl.
CPC ............ *A63F 13/65* (2014.09); *A63F 13/216* (2014.09)

(58) Field of Classification Search
CPC ...... A63F 13/65; A63F 13/216; A63F 13/822; A63F 13/87; A63F 13/75; A63F 13/352; A63F 13/45; A63F 13/533; A63F 13/79
See application file for complete search history.

(56) References Cited

U.S. PATENT DOCUMENTS 9,226,106 B1 * 12/2015 Kornmann ............ A63F 13/537
9,539,498 B1 * 1/2017 Hanke ..................... A63F 13/00
(Continued)

FOREIGN PATENT DOCUMENTS

JP 3551856 B2 8/2004
JP 2014-170417 A 9/2014
JP 2019-80747 A 5/2019

OTHER PUBLICATIONS

International Search Report issued in corresponding International Application No. PCT/JP2021/039724 mailed Jan. 11, 2022 (6 pages).

(Continued)

*Primary Examiner* — Xuan M Thai
*Assistant Examiner* — Shauna-Kay Hall
(74) *Attorney, Agent, or Firm* — Osha Bergman Watanabe & Burton LLP

(57) ABSTRACT

The information processing device includes: a storage; and a controller that: stores, in the storage, participation status information indicating a user participation status in an event occurrence area, wherein the participation status information is associated with the event occurrence area that is set up at a location in a virtual game space corresponding to a location in a real space, determines whether the event occurrence area is in a crowded state based on the participation status information, after determining that the event occurrence area is in the crowded state, restricts participation to the event occurrence area in the virtual game space, and after determining that the event occurrence area is in the crowded state, sets up another event occurrence area in the virtual game space.

9 Claims, 11 Drawing Sheets

(56) References Cited

U.S. PATENT DOCUMENTS

| | | | | |
|---|---|---|---|---|
| 9,545,565 | B1 * | 1/2017 | Kornmann | A63F 13/46 |
| 11,007,429 | B2 * | 5/2021 | Franceus | A63F 13/211 |
| 11,285,382 | B2 * | 3/2022 | Liu | A63F 13/30 |
| 2005/0052450 | A1 * | 3/2005 | Koizumi | A63F 13/52<br>345/419 |
| 2007/0191096 | A1 * | 8/2007 | Tanaka | A63F 13/577<br>463/31 |
| 2011/0107239 | A1 * | 5/2011 | Adoni | A63F 13/60<br>726/8 |
| 2016/0346683 | A1 * | 12/2016 | Worrall | A63F 13/216 |
| 2018/0361248 | A1 * | 12/2018 | Nomura | A63F 13/847 |

OTHER PUBLICATIONS

Written Opinion issued in corresponding International Application No. PCT/JP2021/039724 mailed Jan. 11, 2022 (4 pages).

* cited by examiner

| Character ID | Name | Acquisition probability | Rarity | Ability parameters | ... |
|---|---|---|---|---|---|
| c001 | Character A | 5.0% | 1 | Attack 10, Defense 10, HP 10 | ... |
| c002 | Character B | 3.0% | 2 | Attack 15, Defense 15, HP 15 | ... |
| c003 | Character C | 2.0% | 3 | Attack 20, Defense 20, HP 20 | ... |
| ... | ... | ... | ... | ... | ... |

FIG. 5

| User ID | Rank | Possessed characters | Friend users | Game field information | ... |
|---|---|---|---|---|---|
| u001 | 70 | c051 (Lv99, ···), ··· | c051, u066, ··· | Game field info 001 | ... |
| u002 | 50 | c005 (Lv45, ···), ··· | c005, u017, ··· | Game field info 002 | ... |
| u003 | 5 | c099 (Lv16, ···), ··· | c099, u111, ··· | Game field info 003 | ... |
| ... | ... | ... | ... | ... | ... |

FIG. 6

| Event ID | Name | Event period | Event occurrence area information | ... |
|---|---|---|---|---|
| e001 | Event A | 10/01/2022 to 10/10/2020 | Event occurrence area information 001 | ... |
| e002 | Event B | 10/11/2022 to 10/20/2020 | Event occurrence area information 002 | ... |
| ... | ... | ... | ... | ... |

FIG. 7

| Event occurrence area ID | Location information | Event characters | Reward information | Participation status information | Group information | Corresponding information | ... |
|---|---|---|---|---|---|---|---|
| ea001 | Location information 001 | c051 (Lv79, ···), ··· | c269, ··· | Participation status information 001 | Group information 001 | ea101 | ... |
| ea002 | Location information 002 | c005 (Lv95, ···), ··· | c255, ··· | Participation status information 002 | Group information 002 | ea102 | ... |
| ... | ... | ... | ... | ... | ... | ... | ... |
| ea101 | Location information 101 | c051 (Lv79, ···), ··· | c269, ··· | Participation status information 101 | Group information 101 | ea201 | ... |
| ea102 | Location information 102 | c005 (Lv95, ···), ··· | c255, ··· | Participation status information 102 | Group information 102 | ea202 | ... |
| ... | ... | ... | ... | ... | ... | ... | ... |

FIG. 8

| Event occurrence area ID | Location Information | Event characters | Participation status information | ... |
|---|---|---|---|---|
| e001 | Location information 001 | c120 | Participation status information 001 | ... |
| e002 | Location information 002 | c253 | Participation status information 002 | ... |
| ... | ... | ... | ... | ... |

RECORDING MEDIUM AND INFORMATION PROCESSING DEVICE

TECHNICAL FIELD

The present invention relates to an information processing device and a recording medium storing instructions.

DESCRIPTION OF RELATED ART

There are known information processing devices with which, when the user actually moves in a real space (the real world) while holding a mobile terminal, the movement in the real space is reflected in a virtual game space (a virtual world) as the game proceeds, by specifying a location in the virtual game space corresponding to the user's location in the real space (for example, Patent Literature 1).

PATENT LITERATURE

Patent Literature 1: Japanese Patent No. 3,551,856

In location-based games such as this, when an event occurrence area (area in which events occur) is set up at a location in the virtual game space corresponding to a location in real space, many users may actually move in real space toward the event occurrence area as their destination, so there is the risk that the area may become overcrowded by the users gathered there. If an overcrowded state occurs, the users will have to play in an unpleasant environment, and there is also a risk of spreading infectious disease.

SUMMARY

One or embodiments of the present invention provide a technological improvement over such conventional technologies as discussed above. In particular, one or more embodiments of the present invention provide an information processing device such as a game device and a recording medium storing instructions that determine a situation of a real world environment linked with a virtual world environment, and execute various settings and/or controls of functions depending on the determined situation. As a result, for example, the functionality of the game device is improved, which in turn enhances a user's playing environment.

According to one or more embodiments, there is provided an information processing device comprising:

- a storage unit for storing, in association with an event occurrence area set up at a location in a virtual game space corresponding to a location in real space, participation status information indicating a user participation status in the event occurrence area;
- a crowding determination unit for determining whether the event occurrence area is in a crowded state based on the participation status information; and
- an area control unit for canceling the setting of the event occurrence area in the virtual game space when it is determined that said area is in a crowded state.

Other features of one or more embodiments of the present invention will become apparent from the description in the specification and the appended drawings.

BRIEF DESCRIPTION OF THE DRAWINGS

FIG. 5 is a configuration diagram showing an example of character information;

FIG. 6 is a configuration diagram showing an example of user information;

FIG. 7 is a configuration diagram showing an example of event information;

FIG. 8 is a configuration diagram showing an example of event occurrence area information;

DETAILED DESCRIPTION

Figure 1:
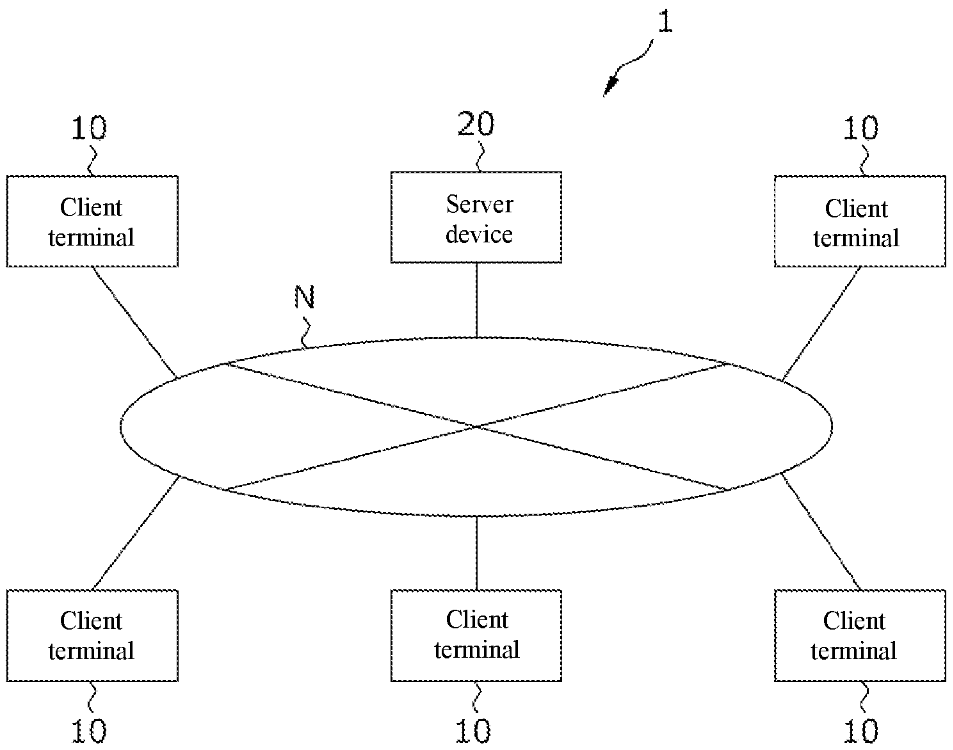
FIG. 1 is a configuration diagram showing an example of an information processing system 1 according to a first embodiment.

At least the following matters will become apparent from the description in this specification and the appended drawings.

That is, the present invention is an information processing device, comprising:

a storage; and a controller that:

stores, in association with an event occurrence area set up at a location in a virtual game space corresponding to a location in real space, participation status information related to the event participation status (or a user participation status) of a user in the event occurrence area;

- determines whether the event occurrence area is in a crowded state based on the participation status information; and
- cancels the setting of or restricts participation to the event occurrence area in the virtual game space when it is determined that said area is in a crowded state.

With this information processing device, additional users will not gather in a crowded event occurrence area, so users who are already participating in an event in that crowded event occurrence area will not be subjected to any further crowding and will be able to play in a relatively pleasant environment.

Also, in this information processing device, the area control unit may set up another event occurrence area different from said event occurrence area in the virtual game space when it is determined that said area is in a crowded state.

With this information processing device, users who are moving toward an event occurrence area as a destination can be distributed, which makes it less likely that the area will become overcrowded, and thus makes it possible to provide the users with a pleasant playing environment.

Also, in this information processing device, the other event occurrence area may be an area in which a user can obtain a same reward as a reward that can be obtained in the event occurrence area.

Also, in this information processing device, the controller may restrict the participation by preventing a user who does not participate an event from participating to the event occurrence area.

Also, in this information processing device, the participation status information stored by the storage unit may include an event participant head count (or a participant head count) indicating the number of users participating in the event among the users in the event occurrence area, and the controller may determine whether said area is in a crowded state by determining whether the event participant head count has reached a predetermined number.

With this information processing device, overcrowding can be ascertained based on the number of users gathered in the event occurrence area who are actually participating in the event, so the users gathered there can be distributed properly.

Also, in this information processing device, the participation status information stored by the storage unit may include an area head count indicating the number of users in the event occurrence area, and the controller may determine whether said area is in a crowded state by determining whether the area head count has reached a predetermined number.

With this information processing device, overcrowding can be ascertained based on the number of users gathered in an event occurrence area, regardless of whether they are participating in an event or not, so the users can be distributed more proactively.

Also, in this information processing device, the controller may set up another event occurrence area within a predetermined range from a location in the virtual game space at which the event occurrence area in the crowded state has been set up.

With this information processing device, the distance that the user actually moves in real space is limited by also limiting the range within which another event occurrence area is set up, so users can be encouraged to change their destination from an event occurrence area that has become overcrowded to another event occurrence area.

Also, in this information processing device, the controller may set up a plurality of other event occurrence areas different from the event occurrence area in the virtual game space when it is determined that said area is in a crowded state, and execute a processing to give preferential treatment to a user who participates in an event in another event occurrence area that satisfies a preferential treatment condition among the plurality of other event occurrence areas that are set up.

With this information processing device, events are treated preferentially in another event occurrence area, which is the destination to which a user actually moves in real space, so users can be encouraged to change their destination from an event occurrence area that has become overcrowded to another event occurrence area.

Also, in this information processing device,

The controller may determine whether one group can be created by a plurality of users in the event occurrence area in at least one of the plurality of event occurrence areas and, if it is determined that one group cannot be created, for creating one group by supplementing it with users (adding a user) from outside of said event occurrence area.

With this information processing device, the social aspect of a game that uses location information can be enhanced while distributing users who are moving toward an event occurrence area as a destination.

Also, in this information processing device, even if it is determined that one group can be created by a plurality of users in said event occurrence area, the controller may add to the one group any users who have a friend relationship with any user in the one group among the users outside of the event occurrence area.

With this information processing device, since communication among users who are in a friend relationship is maintained regardless of whether they are inside or outside of the event occurrence area, the social aspect can be further enhanced.

The present invention is also a non-transitory computer readable recording medium storing instructions for an information processing device that determines a situation of a real world environment linked with a virtual world environment and executes a setting and a control of functions depending on the determined situation, the instructions causing a computer to execute:

storing, in association with an event occurrence area set up at a location in a virtual game space corresponding to a location in real space, participation status information related to the event participation status of a user in the event occurrence area;

determining whether the event occurrence area is in a crowded state based on the participation status information;

restricting participation to the event occurrence area in the virtual game space when it is determined that said area is in a crowded state; and after determining that the event occurrence area is in the crowded state, setting up another event occurrence area in the virtual game space.

With this recording medium, additional users will not gather in a crowded event occurrence area, so users who are already participating in an event in that crowded event occurrence area will not be subjected to any further crowding and will be able to play in a relatively pleasant environment.

First Embodiment

The information processing device, recording medium, and information processing system according to a first embodiment of the present invention will now be described in detail. The present invention can be broadly applied to an information processing device, recording medium, information processing system, or the like employing a location-based game that uses information about a user's location in real space.

System Configuration

FIG. 1 is a configuration diagram showing an example of an information processing system 1 according to the first embodiment. As shown in FIG. 1, in the information processing system 1 according to this embodiment, one or more client terminals 10 and a server device 20 are connected via a network N.

This is a terminal device having the function of a digital camera (hereinafter also simply referred to as a "camera"), such as a smartphone, that is operated by a user. The server device 20 manages and controls games played by the user on the client terminal 10, performs billing processing in the game, and so forth. The network N is the Internet or the like, and includes mobile wireless base stations and the like.

The information processing system 1 shown in FIG. 1 is merely an example, and it goes without saying that there are various system configuration examples, depending on the application and purpose. For instance, the server device 20 in FIG. 1 may be distributed among a plurality of computers. Also, the server device 20 may assume some of the functions of the client terminal 10, or the client terminal 10 may assume some of the functions of the server device 20.

Hardware Configuration

Server Device

Figure 2:
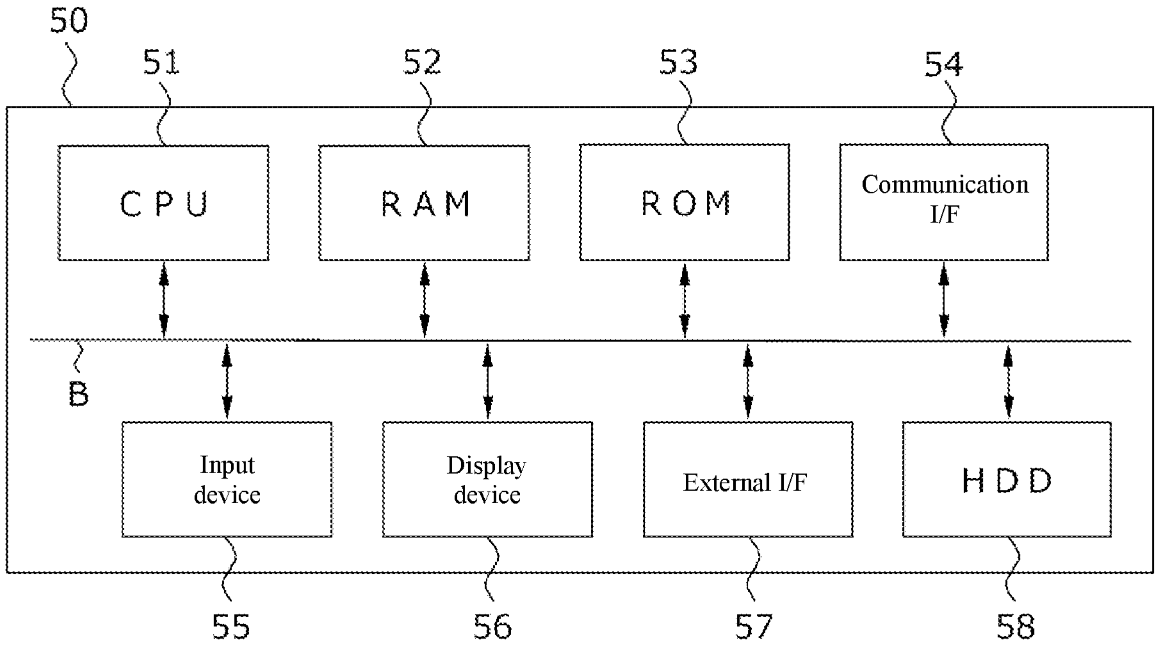
FIG. 2 is a hardware configuration diagram showing an example of a server device 20 according to the first embodiment.

FIG. 2 is a hardware configuration diagram showing an example of the server device 20 according to the first embodiment. The server device 20 according to this embodiment is, for example, a computer 50 having the hardware configuration shown in FIG. 2. The computer 50 is an example of an information processing device.

As shown in FIG. 2, the computer 50 comprises a CPU 51, a RAM 52, a ROM 53, a communication interface 54, an input device 55, a display device 56, an external interface 57, an HDD 58, and the like, all of which are connected to each other by a bus line B. The input device 55 and the display device 56 may be connected and used only when necessary.

The CPU 51 is an arithmetic device that reads programs (or instructions) and data from a storage device such as the ROM 53 or the HDD 58 onto the RAM 52, and executes various processing based on the program or data that has been read, thereby realizing control and functions of the computer as a whole.

The RAM 52 is an example of a volatile semiconductor memory (storage device) for temporarily holding programs (or instructions) and data, and it is also used as a work area when the CPU 51 executes various processing.

The ROM 53 is an example of a non-volatile semiconductor memory (storage device) that can hold programs (or instructions) and data even when the power is turned off. The ROM 53 stores programs (or instructions) and data such as the BIOS, OS settings, and network settings that are executed when the computer 50 is booted up.

The communication interface 54 is an interface for connecting the computer 50 to the network N. This allows the computer 50 to perform data communication via the communication interface 54.

The input device 55 is used by the administrator to input various signals. The input device 55 in this embodiment is, for example, an operating device such as a keyboard, mouse, or touch panel.

The display device 56 is used for displaying various information on the screen for the administrator. The display device 56 in this embodiment is, for example, a display such as a liquid crystal or organic EL display.

The external interface 57 is an interface for connecting to an external device so as to allow data communication. This allows the computer 50 to read from and/or write to the recording medium via the external interface 57. The external device is, for example, a recording medium such as a flexible disk, CD, DVD, SD memory card, or USB memory.

The HDD 58 is an example of a non-volatile storage device that stores programs (or instructions) and data. The stored programs and data include an OS, which is basic software that controls the computer as a whole, and applications that provide various functions on the OS.

A drive device (such as a solid-state drive: SSD) using flash memory as a storage medium may be used in place of the HDD 58.

The server device 20 according to this embodiment can realize various kinds of processing (discussed below) by executing a program (or an instruction) in the computer 50 having the above-mentioned hardware configuration.

Client Terminal

Figure 3:
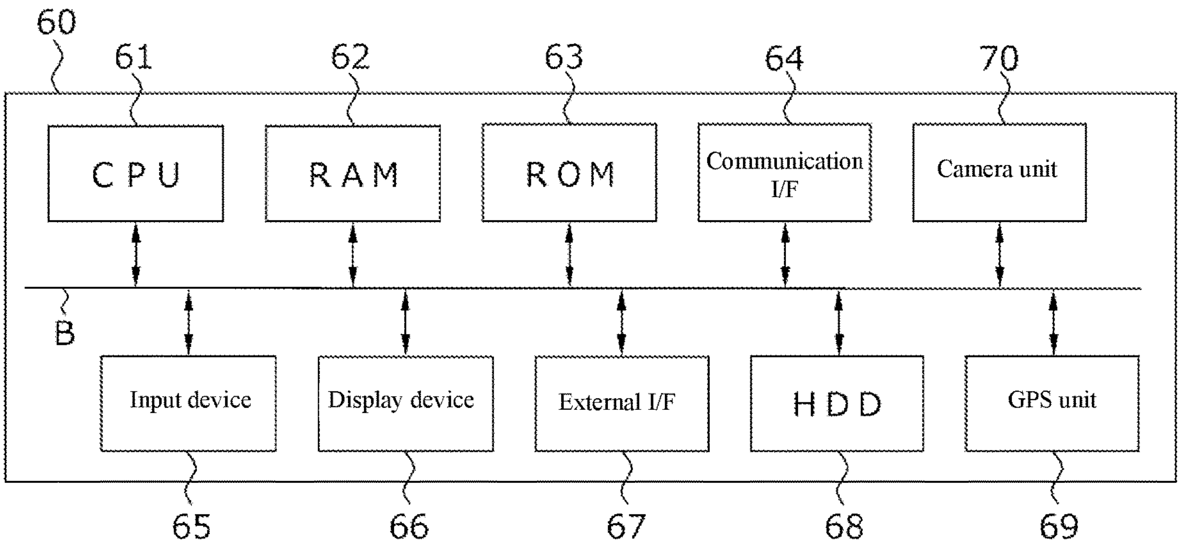
FIG. 3 is a hardware configuration diagram showing an example of a client terminal 10 according to the first embodiment.

FIG. 3 is a hardware configuration diagram showing an example of the client terminal 10 according to the first embodiment. The client terminal 10 according to this embodiment is, for example, a computer 60 having the hardware configuration shown in FIG. 3. The computer 60 is an example of an information processing device.

As shown in FIG. 3, the computer 60 comprises a CPU 61, a RAM 62, a ROM 63, a communication interface 64, an input device 65, a display device 66, an external interface 67, an HDD 68, a GPS unit 69, a camera unit 70, and the like, all of which are connected to each other by a bus line B.

The CPU 61 is an arithmetic device that reads programs (or instructions) and data from a storage device such as the ROM 63 or the HDD 68 onto the RAM 62, and executes various processing based on the program or data that has been read, thereby realizing control and functions of the computer as a whole.

The RAM 62 is an example of a volatile semiconductor memory (storage device) for temporarily holding programs (or instructions) and data, and it is also used as a work area when the CPU 61 executes various processing.

The ROM 63 is an example of a non-volatile semiconductor memory (storage device) that can hold programs (or instructions) and data even when the power is turned off. The ROM 63 stores programs (or instructions) and data such as the BIOS, OS settings, and network settings that are executed when the computer 60 is booted up.

The communication interface 64 is an interface for connecting the computer 60 to the network N. This allows the computer 60 to perform data communication via the communication interface 64.

The input device 65 is used by the user to input various signals. The input device 65 in this embodiment is, for example, an operating device such as a touch panel, operation keys or buttons, a keyboard, or a mouse. The touch panel is made up of, for example, a pressure-sensitive or electrostatic panel installed on the display device 66, and detects a touch position on the display device 66 made by a touch operation with a finger, a touch pen, or the like.

The display device 66 is used for displaying various information on the screen to the user. The display device 66 in this embodiment is, for example, a display such as a liquid crystal or organic EL display.

The external interface 67 is an interface for connecting to an external device so as to allow data communication. This allows the computer 60 to read from and/or write to the recording medium via the external interface 67. The external device is, for example, a recording medium such as a flexible disk, CD, DVD, SD memory card, or USB memory.

The HDD 68 is an example of a non-volatile storage device that stores programs (or instructions) and data. The stored programs and data include an OS, which is basic software that controls the computer as a whole, and applications that provide various functions on the OS.

A drive device (such as a solid-state drive: SSD) using flash memory as a storage medium may be used in place of the HDD 68.

The GPS unit 69 is a device that has a GPS sensor or the like and uses radio waves from GPS satellites to acquire location information representing the current location in real space. Location information is location data such as latitude and longitude, for example. This location information is not limited to latitude and longitude, and may be any information that can specify the user's location in real space. For example, a method may be used in which positioning is performed based on the strength of radio waves for a specific wireless communication access point. Or, the orientation or inclination of the terminal may be ascertained using a known gyro sensor or the like, and information about the orientation or inclination may be used as part of the location information.

The camera unit 70 is an imaging device that generates a captured image by imaging real space using a camera having an imaging device such as a CCD or a CMOS. The camera unit 70 in this embodiment is configured such that a camera is provided on the back side of the display device 66 so that the direction of the image captured by the lens of the camera and the direction of the line of sight of the user looking at the display device 66 will be approximately the same.

The client terminal 10 according to this embodiment can realize various kinds of processing (discussed below) by executing a program (or an instruction) in the computer 60 having the above-mentioned hardware configuration.

Software Configuration

Server Device

Figure 4:
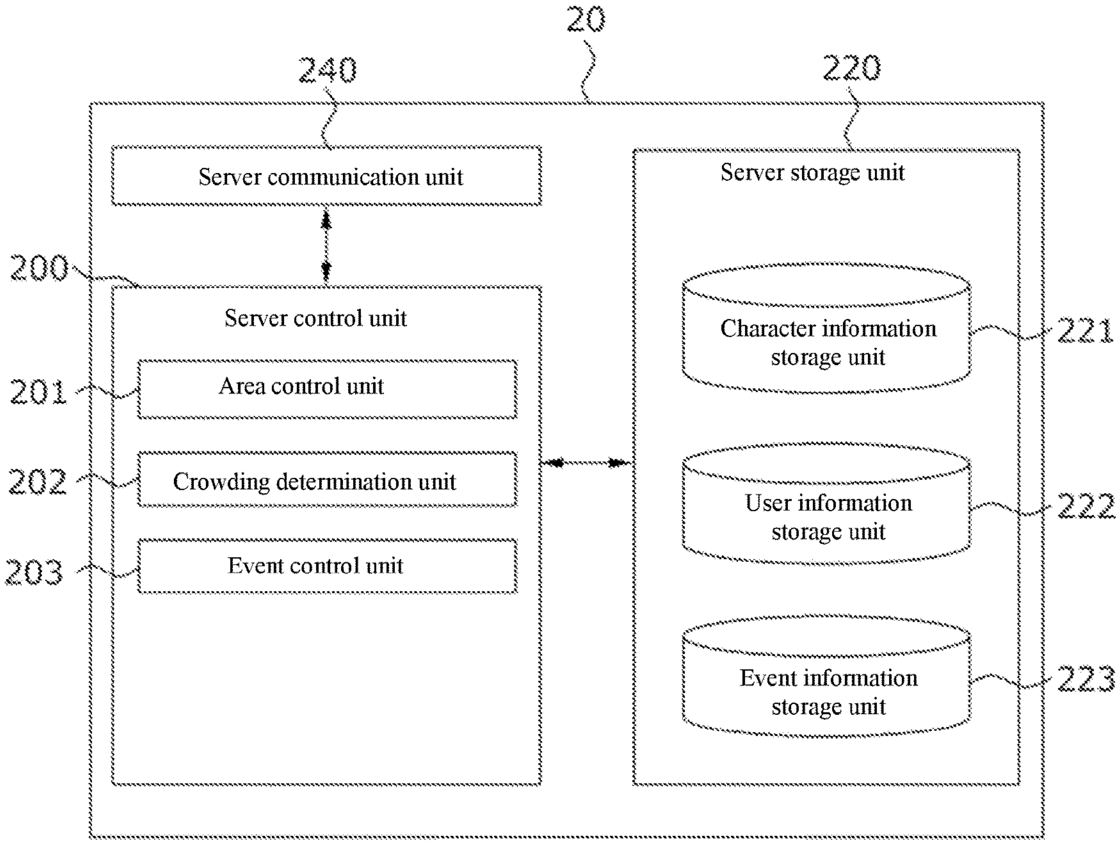
FIG. 4 is a functional block diagram showing an example of the server device 20 according to the first embodiment.

FIG. 4 is a functional block diagram showing an example of the server device 20 according to the first embodiment. The server device 20 according to this embodiment is realized by the functional blocks shown in FIG. 4, for example.

The server device 20 according to this embodiment executes a program (or an instruction) to realize a server control unit (or a server controller) 200, a server storage unit (or a server storage) 220, and a server communication unit 240 (or a server communication interface).

The server control unit 200 has the function of executing various kinds of processing in the server device 20. This server control unit 200 includes an area control unit 201, a crowding determination unit 202, and an event control unit 203.

The area control unit 201 performs control related to an event occurrence area in which events are generated in a location-based game. An "event" is an event game that takes place and can be played for a limited period of time. For example, this can be a game in which a user fights against a special enemy character that appears only during an event period, a game in which a user collects special characters that appear only during an event period, or the like. The area control unit 201 in this embodiment sets up another event occurrence area different from the first event occurrence area when it is inferred that the first event occurrence area is in a crowded state (overcrowded state).

The crowding determination unit 202 determines whether the event occurrence area is in a crowded state (overcrowded state). The crowding determination unit 202 in this embodiment refers to participation status information associated with an event occurrence area, thereby determining whether an area crowding condition, which is a condition for inferring that an event occurrence area is in a crowded state, is met. The area crowding condition is, for example, that the number of users in the event occurrence area is a predetermined number or more, or that the number of users participating in an event, among the users in the event occurrence area, is a predetermined number or more, etc.

The event control unit 203 performs overall control related to events in a location-based game. The event control unit 203 in this embodiment, for example, creates a group consisting of a plurality of users in the event occurrence area, and controls the event as a whole as a group unit. It also counts the number of users who have entered an event occurrence area, the number of users participating in the event among the users in the area, and so forth, and periodically updates the participation status information for that event occurrence area.

The server storage unit 220 has the function of storing various information used in a location-based game. This server storage unit 220 includes a character information storage unit 221, a user information storage unit 222, and an event information storage unit 223.

The character information storage unit 221 is an example of a content information storage unit, and stores character information (content information) related to characters, as an example of content. The character information stored in the character information storage unit 221 is made up of the various data discussed below.

FIG. 5 is a configuration diagram showing an example of character information. The character information shown in FIG. 5 has categories such as character ID, name, acquisition probability, rarity, and ability parameters. Character ID is information for uniquely identifying each type of character. Name is information indicating a character name. Acquisition probability is information indicating the probability of a character being acquired by the user as a reward in an event or the like. Here, the higher the rarity of a character, the lower its acquisition probability. Rarity is information indicating the rarity value of a character. Here, one of a plurality of levels of rarity is initially set up. In this embodiment, five levels of rarity can be set up, from "1" to "5." Ability parameters is information indicating the ability that a character has. Here, ability values such as attack, defense, and HP (hit points) are initially set.

The user information storage unit 222 stores user information related to the users who play a location-based game. The user information stored by the user information storage unit 222 is made up of the various data discussed below.

FIG. 6 is a configuration diagram showing an example of user information. The user information shown in FIG. 6 has categories such as user ID, rank, possessed characters, friend users, and game field information. User ID is information for uniquely identifying a user. Rank is information indicating the current game level of the user. Possessed characters is information indicating one or more kinds of characters possessed by the user at the present time, among the plurality of characters set in the character information stored in the character information storage unit 221. Here, as shown in parentheses in the drawing, the current ability values (level, attack power, defense power, HP, etc.) of a possessed character are also set. Friend users is information indicating other users with whom a mutual friend relationship has been established. Game field information is information related to a virtual game space (game field) that corresponds to real space. Since the game field information is configured using map information about real space, it has a map configuration common to the geography of the real space, such as roads, buildings, rivers, and mountains. Game field information also includes information (event occurrence area ID, location information about the event occurrence area in real space, location information about the virtual game space, event characters, rewards, etc.) related to one or more of the event occurrence areas set up in the user's own game field used by the user in the game among the plurality of event occurrence areas set up in the event occurrence area information associated with an ongoing event.

The event information storage unit 223 stores event information related to the events of a location-based game. The event information stored by the event information storage unit 223 is made up of the various data shown below. In an event in this embodiment, it is possible to play a multiplayer battle game in which the users battle against a raid boss.

FIG. 7 is a configuration diagram showing an example of event information. The event information shown in FIG. 7 has categories such as event ID, event name, event period, and event occurrence area information. Event ID is information for uniquely identifying an event. Name is information indicating an event name. Event period is information indicating the time period during which the event is held. In other words, the user can play an event game only during that event period. Event occurrence area information is information related to a plurality of event occurrence areas set up in the game field.

FIG. 8 is a configuration diagram showing an example of event occurrence area information. The event occurrence area information shown in FIG. 8 has categories such as event occurrence area ID, location information, event characters, reward information, participation status information, group information, and correspondence information. Event occurrence area ID is information for uniquely identifying an event occurrence area. Location information is information for specifying the location of an event occurrence area in real space or virtual game space. For example, it is location data for the two-dimensional coordinate system of the virtual game space in which an event occurrence area is disposed, or location data such as the latitude and longitude of the corresponding real space. The event occurrence area has a region of a certain range based on this location data (such as a radius of 20 meters centered on that location). Event characters is information indicating a character used in an event. In this embodiment, one of a plurality of characters set in the character information stored in the character information storage unit 221 is set as an event character (raid boss) that is a common opponent for a plurality of users, and as shown in parentheses in the drawing, current ability parameters (attack power, defense power, HP, etc.) are also set. Reward information is information indicating a reward given to a user in an event. In this embodiment, for example, a reward is set to be given to a user who wins a battle against a raid boss in an event (such as a special character or the like). Participation status information is information related to the participation status in an event of users in an event occurrence area. In this embodiment, this includes the number of users in an event occurrence area (area head count) and their user IDs, the number of users participating in the event among the users in the area (event participant head count) and their user IDs, the number of users who are not participating in the event (event non-participation head count) and their user IDs, and the like. This participation status information fluctuates as users enter and exit the event occurrence area and participate in and leave an event. Group information is information related to groups participating in an event occurring in an event occurrence area. In this embodiment, this includes information related to the users constituting a group. Correspondence information is information indicating another event occurrence area associated with an event occurrence area. In this embodiment, for example, another event occurrence area is set up within a predetermined range from a location in the virtual game space in which the event occurrence area has been set up (such as within a radius of 500 meters centered on a location in the event occurrence area). When an area crowding condition has been met in an event occurrence area, another event occurrence area associated with that event occurrence area is additionally set up in the user's game field. Also, in this other event occurrence area, the same event characters and rewards are set as those set in the associated event occurrence area.

The server communication unit 240 has the function of communicating with the client terminal 10 via the network N.

Client Terminal

Figure 9:
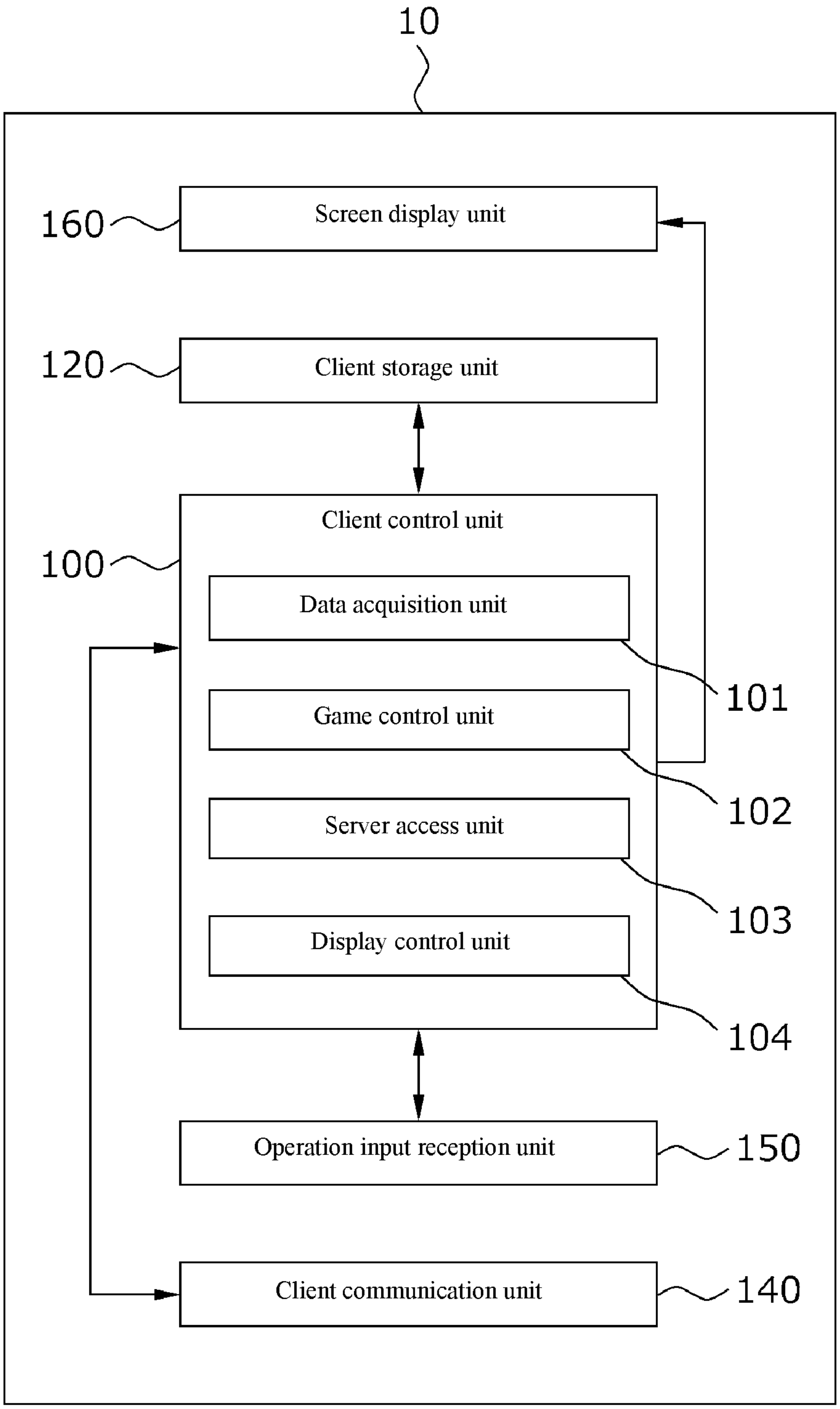
FIG. 9 is a functional block diagram showing an example of the client terminal 10 according to the first embodiment.

FIG. 9 is a functional block diagram showing an example of the client terminal 10 according to the first embodiment. The client terminal 10 according to this embodiment is realized by the functional blocks shown in FIG. 9, for example.

The client terminal 10 according to this embodiment executes a program (or an instruction) to realize a client control unit (or a client controller) 100, a client storage unit (or a client storage) 120, a client communication unit (or a client communication interface) 140, an operation reception unit 150, and a screen display unit 160.

The client control unit 100 has the function of executing various kinds of processing in the client terminal 10. This client control unit 100 includes a data acquisition unit 101, a game control unit 102, a server access unit 103 and a display control unit 104.

The data acquisition unit 101 acquires data that is needed to specify the user's location in real space. The data acquisition unit 101 in this embodiment acquires location information (latitude and longitude) about the client terminal 10 (user) in real space by using the GPS unit 69 that detects radio waves from GPS satellites. This data acquisition unit 101 acquires location information about real space at regular time intervals (such as every 5 seconds) after the game application is activated.

The game control unit 102 performs individual control related to events in a location-based game. The game control unit 102 in this embodiment individually controls the progress of a location-based game played by the user, based on the location information about the client terminal 10 (user) in real space acquired by the data acquisition unit 101, and game operations from the user received by the client terminal 10.

The server access unit 103 sends various processing requests to the server device 20 and receives the processing result or the like as a response from the server device 20 when access to the server device 20 becomes necessary in the course of the various kinds of processing executed by the data acquisition unit 101 and the game control unit 102.

The display control unit 104 controls the screen display of the client terminal 10 according to the progress of the location-based game controlled by the game control unit 102. For example, the display control unit 104 in this embodiment generates a virtual game space, in which roads, buildings, and so forth corresponding to the geography of real space are disposed, in conjunction with the location information about the user moving in real space, and displays a game field screen for game play by the user. If an event occurrence area is set up for the user's game field, a game field screen including that event occurrence area is displayed according to the user's location in real space.

The operation input reception unit 150 receives operation inputs from the user who operates the client terminal 10. The client storage unit 120 stores installed applications (game applications, etc.), and various programs (or instructions) and data that are required by the client terminal 10 (such as character information, user information, event information, etc., just as with the server device 20). The client communication unit 140 communicates with the server device 20. The screen display unit 160 displays the screen of the client terminal 10 under the control of the display control unit 104.

As discussed above, with the information processing system 1 according to this embodiment, game progress and display control are performed in the client terminal 10, but the server device 20 may perform these instead. More specifically, the game control unit and/or the display control unit may not be provided to the client control unit 100 of the client terminal 10, and may instead be provided to the server control unit 200 of the server device 20.

Also, the client control unit 100 of the client terminal 10 may be a browser type that receives page data written in HTML (HyperText Markup Language) or the like, scripts included in the page data, and so forth from the server device 20, and executes game-related processing. Also, the client control unit 100 of the client terminal 10 may be an application type that performs game-related processing based on an installed application. FIG. 9 shows an application type as an example.

System Overview

An overview of the system in the first embodiment will now be described. The system in this embodiment provides a location-based game to the user. A location-based game is a game in which, when the user holding the client terminal 10 moves in real space, the location in the virtual game space corresponding to the user's location in real space is specified, and movement in real space is reflected in the virtual game space.

With the location-based game of this embodiment, an event occurrence area, which is an area where an event occurs, is set up in the virtual game space during the event period. That is, the event occurrence area is set up at a location in real space corresponding to the location in the virtual game space. A user who actually moves in real space toward an event occurrence area as a destination and enters the event occurrence area can participate in an event in that event occurrence area (that is, can play the event game in the event occurrence area).

The event in this embodiment is a multiplayer battle game that takes place in an event occurrence area. In the event occurrence area, a raid boss that is a common opponent for multiple users is set up, and users who have entered the event occurrence area form a group with other users in that area and fight against the raid boss as a group. Each user in the group can obtain a reward if the battle against the raid boss is won.

Thus, when an event occurrence area is set up in the virtual game space, many users may actually move in real space toward the event occurrence area as a destination, so there is a risk that the area may become overcrowded by the users gathered there. If overcrowding occurs in the event occurrence area, the users will have to play in an unpleasant environment, and there is also a risk of spreading infectious disease.

In view of this, in the location-based game in this embodiment, an event occurrence area that has become overcrowded is specified, participation in the event in that event occurrence area is restricted, and another event occurrence area different from the first event occurrence area is set up. In an event in this other event occurrence area, the users can fight against the same raid boss as in the event occurrence area that has become overcrowded. Consequently, users who are moving toward an event occurrence area as a destination can be distributed, which makes it less likely that the area will become overcrowded, and thus makes it possible to provide the users with a pleasant playing environment.

Figure 10:
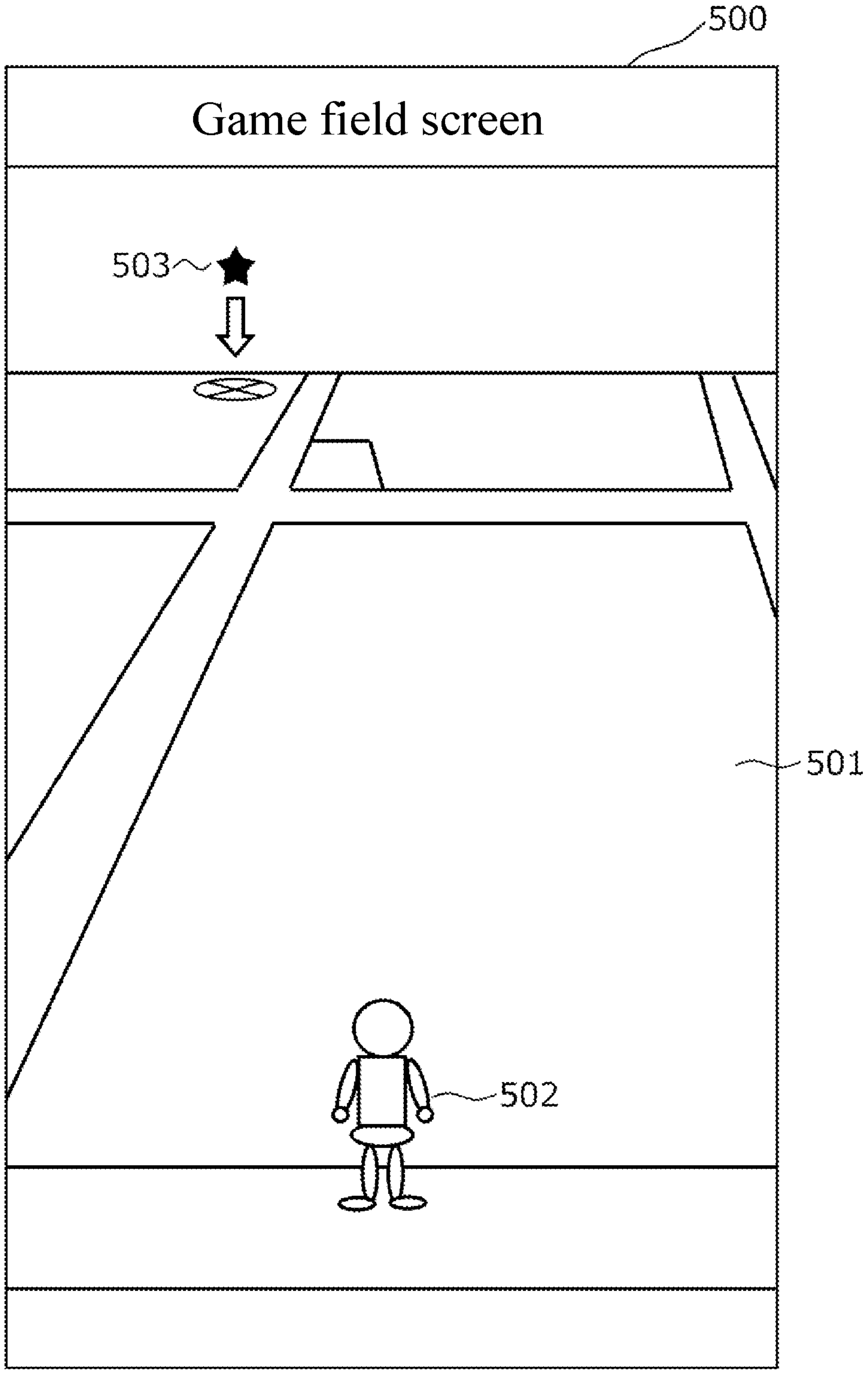
FIG. 10 is a conceptual diagram showing an example of a game field screen before another event occurrence area is set up.
Figure 11:
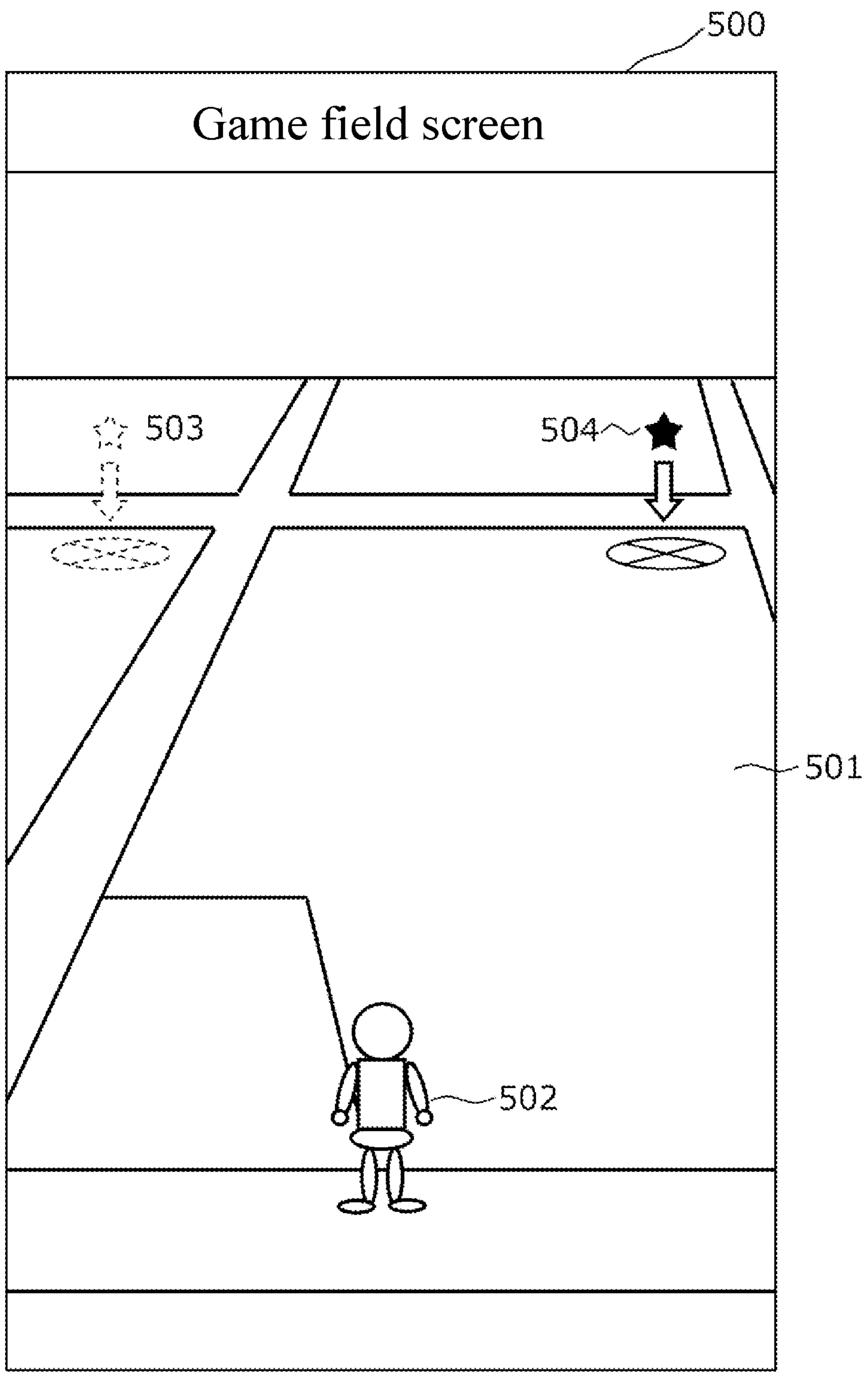
FIG. 11 is a conceptual diagram showing an example of the game field screen after another event occurrence area has been set up.

Here, changes in the game field screen when an event occurrence area becomes overcrowded will be described in specific terms with reference to FIGS. 10 and 11. FIG. 10 is a conceptual diagram showing an example of the game field screen before another event occurrence area is set up. On the game field screen 500 shown in FIG. 10 are displayed a game field 501, a user character 502 indicating the user's current location, and a mark 503 indicating the location of an event occurrence area. FIG. 11 is a conceptual diagram showing an example of the game field screen after another event occurrence area has been set up. A mark 504 indicating the location of the other event occurrence area is also displayed on the game field screen 500 shown in FIG. 11.

First, the user holding the client terminal 10 actually moves in real space from the current location where user character 502 is located toward the event occurrence area as a destination indicated by the mark 503, while looking at the game field screen 500 shown in FIG. 10 on the display device 66. At this point, it is assumed that the event occurrence area indicated by the mark 503 has not become overcrowded. After this, if the event occurrence area indicated by the mark 503 becomes overcrowded as a user approaches the destination, another event occurrence area is set up on the game field. Then, when the user holding the client terminal 10 looks at the game field screen 500 shown in FIG. 11, the event occurrence area indicated by the mark 503 is gone and another event occurrence area indicated by the mark 504 appears, so the user actually moves in real space toward another event occurrence area as a new destination indicated by the mark 504. Thus, with the location-based game of this embodiment, users who are moving toward an event occurrence area as a destination can be effectively distributed.

System Operation

Setting Up the Event Occurrence Area

Figure 12:
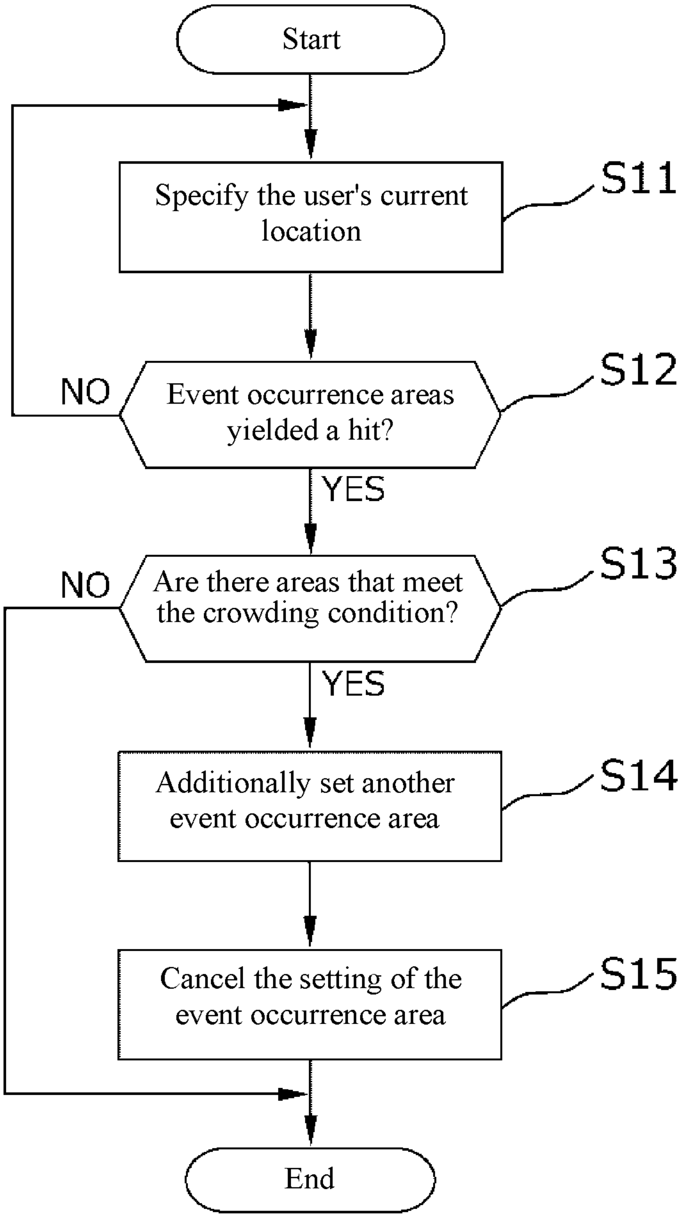
FIG. 12 is a flowchart illustrating an operation example related to the setting of an event occurrence area in the first embodiment.

FIG. 12 is a flowchart illustrating an operation example related to the setting of an event occurrence area in the first embodiment.

After the game application has been activated, the data acquisition unit 101 of the client terminal 10 acquires the user's location information (latitude and longitude) in real space by detecting radio waves from GPS satellites with the GPS unit 69. Then, the server access unit 103 of the client terminal 10 sends the location information acquired by the data acquisition unit 101 to the server device 20 along with the user ID.

Upon receiving the location information sent from the client terminal 10 along with the user ID, the area control unit 201 of the server device 20 refers to the game field information included in the user information shown in FIG. 6 and specifies the location (current location) in the virtual game space corresponding to the user's location in real space (step S11).

Next, the area control unit 201 of the server device 20 searches for event occurrence areas located within a predetermined range from the user's current location (such as within a radius of 2 km centered on the user's current location) among the event occurrence areas set in the user's game field, based on the game field information included in the user information shown in FIG. 6, and thereby determines whether there are hits for one or more event occurrence areas (step S12).

If the search result yields no hits for event occurrence areas ("No" in step S12), the area control unit 201 of the server device 20 goes back to step S11 and repeats the processing. On the other hand, if there are one or more hits for event occurrence areas ("Yes" in step S12), the processing proceeds to step S13.

Next, if there are one or more hits for event occurrence areas in the user's game field, the area control unit 201 of the server device 20 requests the crowding determination unit 202 to execute determination processing to find whether the event occurrence areas that yielded hits include any event occurrence areas that meet an area crowding condition, which is a condition for inferring whether an event occurrence area is in a crowded state. Upon receiving this request, the crowding determination unit 202 of the server device 20 refers to the participation status information included in the event occurrence area information shown in FIG. 8 and determines whether the event occurrence areas that yielded hits meet the area crowding condition (step S13). Any condition can be set as this area crowding condition as long as it is a condition for inferring that an event occurrence area is in a crowded state.

For example, the area crowding condition may be that, among the users located in an event occurrence area, at least a predetermined number of them (such as 20 or more) are participating in an event. In this case, the area control unit 201 of the server device 20 refers to the event participant head count included in the participation status information and determines whether the event occurrence area is in a crowded state. Consequently, overcrowding can be ascertained based on the number of users gathered in the event occurrence area who are actually participating in the event, so the users gathered there can be distributed properly.

Also, for example, the area crowding condition may be that the number of users located in the event occurrence area is at least a predetermined number (such as 40 or more). In this case, the area control unit 201 of the server device 20 refers to the area head count included in the participation status information and determines whether the event occurrence area is in a crowded state. Consequently, overcrowding can be ascertained based on the number of users gathered in an event occurrence area, regardless of whether they are participating in an event or not, so the users can be distributed more proactively.

If there is no event occurrence area that meets the area crowding condition ("No" in step S13), the area control unit 201 of the server device 20 ends this processing. On the other hand, if there is an event occurrence area that meets the area crowding condition ("Yes" in step S13), the processing proceeds to step S14.

Next, if there is an event occurrence area that meets the area crowding condition, the area control unit 201 of the server device 20 sets up another event occurrence area at a location different from the location in the virtual game space where the first event occurrence area is set up (step S14).

That is, the area control unit 201 of the server device 20 refers to the correspondence information included in the event occurrence area information shown in FIG. 8 and specifies another event occurrence area associated with the event occurrence area that meets the area crowding condition. Then, the game field information included in the user information shown in FIG. 6 is updated, and information related to this other specified event occurrence area (event occurrence area ID, information about the location in real space of the other event occurrence area, information about the location in the virtual game space, event characters, rewards, etc.) is additionally set in that user's game field.

In this embodiment, as shown in FIG. 8, in the other event occurrence areas, the event characters and rewards that are set are the same as those set in the associated event occurrence area. Therefore, because of this additional setting, there is another event occurrence area created in the user's game field, and furthermore, the same event characters and rewards, etc., as in the event occurrence area that was originally the destination can be acquired in events in this new event occurrence area, so users who are moving toward the event occurrence area as the destination can be effectively distributed.

Also, in this embodiment, as discussed above, other event occurrence areas are located within a predetermined range from the location in the virtual game space in which the associated event occurrence area is set up (such as within a radius of 500 meters centered on a location in the event occurrence area). Thus, limiting the location of another event occurrence area to a short distance from the event occurrence area that meets the area crowding condition also limits the distance that the users actually move in real space toward the new destination. Consequently, users can be encouraged to change their destination from an event occurrence area that became overcrowded to another event occurrence area.

The location in the virtual game space where another event occurrence area is set up is sometimes displayed at another location within the same game field screen 500, as shown in FIG. 11. In this case, since the distance that a user will actually have to move toward the new destination in real space is limited to the range that can be seen on the screen, users can be further encouraged to change their destination from an event occurrence area that became overcrowded to another event occurrence area.

Next, the area control unit 201 of the server device 20 updates the game field information included in the user information shown in FIG. 6 and cancels the setting up of event occurrence areas that have been set up in the user's game field and which meet the area crowding condition (step S15). Because of this cancelation, there will be no event occurrence areas that meet the area crowding condition in the user's game field, so participation in an event in an event occurrence area that meets the area crowding condition will be effectively restricted.

Thus, while other event occurrence areas are additionally set up in the user's game field, event occurrence areas that meet the area crowding condition are canceled. This means that, as shown in FIG. 11, for example, those event occurrence areas that meet the area crowding condition (event occurrence areas indicated by the mark 503) are not displayed in the game field screen 500 seen by the user, while other event occurrence areas (other event occurrence areas indicated by the mark 504) are displayed instead. Consequently, users can be guided to an event occurrence area that is different from an event occurrence area that has become overcrowded, so that users who are moving toward an event occurrence area as a destination can be effectively distributed.

Events in Event Occurrence Areas

Figures 13, 14:
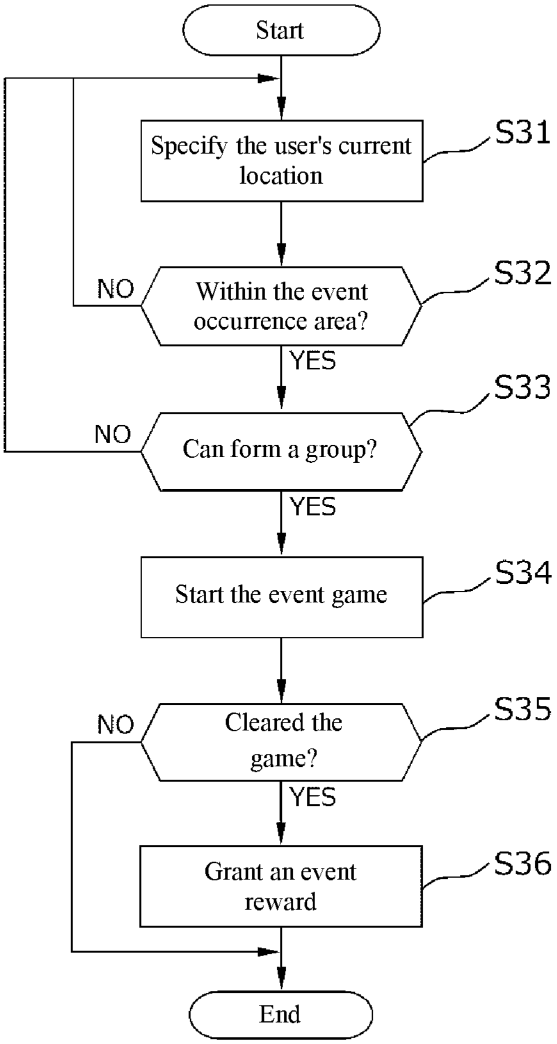
FIG. 13 is a flowchart illustrating an operation example related to an event in an event occurrence area in the first embodiment.
FIG. 14 is a configuration diagram showing an example of event occurrence area information.

FIG. 13 is a flowchart illustrating an operation example related to an event in an event occurrence area in the first embodiment. A case will be described below in which an event occurring in an event occurrence area is a battle game in which multiple users in the area can compete against a common opponent, a raid boss.

After the game application has been activated, the data acquisition unit 101 of the client terminal 10 acquires the user's location information (latitude and longitude) in real space by detecting radio waves from GPS satellites with the GPS unit 69. Then, the server access unit 103 of the client terminal 10 sends the location information acquired by the data acquisition unit 101 to the server device 20 along with the user ID.

Upon receiving the location information sent from the client terminal 10 along with the user ID, the event control unit 203 of the server device 20 refers to the game field information included in the user information shown in FIG. 6 and specifies the location (current location) in the virtual game space corresponding to the user's location in real space (step S31).

Next, the event control unit 203 of the server device 20 determines whether the user's current location is within the event occurrence area set up in that user's game field based on the game field information included in the user information shown in FIG. 6 (step S32).

Then, if the user's current location is not within the event occurrence area set up in the user's game field ("No" in step S32), the event control unit 203 of the server device 20 goes back to step S31 and repeats the processing. On the other hand, if the user's current location is within the event occurrence area set up in the user's game field ("Yes" in step S32), the processing proceeds to step S33.

Next, if the user's current location is within the event occurrence area set up in the user's game field, the event control unit 203 of the server device 20 refers to the participation status information included in the event occurrence area information shown in FIG. 8 and combines users located in that event occurrence area with other users currently located in that same event occurrence area, thereby determining whether a single group consisting of a predetermined number of users (such as ten) can be formed (step S33).

Then, if there are not enough users in the event occurrence area to form a group of a predetermined number of users ("No" in step S33), the event control unit 203 of the server device 20 goes back to above-mentioned step S31 and repeats the processing. On the other hand, if a group consisting of a predetermined number of users can be formed by combining users in the event occurrence area ("Yes" in step S33), the group information included in the event occurrence area information shown in FIG. 8 is updated, and information related to the users constituting the group formed in that manner is additionally set for that event occurrence area. Also, the participation status information included in the event occurrence area information shown in FIG. 8 is updated, each of the users constituting the group formed in this manner is additionally set up for the event occurrence area as a user who has participated in the event, and the number of these users is added to the event participant head count.

Even if a group of a predetermined number of users cannot be formed, a group of fewer than the predetermined number of users may be formed after a predetermined period of time has passed. Also, a group may be formed solely of friends, at a user's request. In this case, the group may have less than the predetermined number of users.

Next, the event control unit 203 of the server device 20 requests the client terminal 10 owned by each user to start an event game in which users in the group formed in the manner described above fight against a raid boss, who is a common enemy for the users. Upon receiving this request from the server device 20, the game control unit 102 of the client terminal 10 starts the event game according to the game operation by the user (step S34).

Next, the event control unit 203 of the server device 20 determines whether the group formed in the manner described above has cleared the game as a result of starting the event game on the client terminal 10 (step S35).

Then, the event control unit 203 of the server device 20 determines that the raid boss has been defeated and that the game has been cleared ("Yes" in step S35) if the HP set for the raid boss begins dropping when the users in the group formed in the manner described above attack within a predetermined battle time and eventually reaches a predetermined value (such as when it reaches zero). On the other hand, if the raid boss cannot be defeated within the predetermined battle time, it is determined that the game has not been cleared ("No" in step S35).

Next, if it is determined that the group formed in the manner described above has cleared the game, the event control unit 203 of the server device 20 grants event rewards to the users in the group according to the reward information included in the event occurrence area information shown in FIG. 8 (step S36).

Thus, with the system in the first embodiment, even if users form a group in the same event occurrence area and participate in an event, it is less likely that the area will become overcrowded, and it thus becomes possible to provide the users who gather in the event occurrence area with a pleasant playing environment.

Modification Examples

Area Crowding Condition

In the first embodiment described above, an example was given in which the area crowding condition was that the event participant head count in an event occurrence area was a predetermined number or more, or that the area head count in the event occurrence area was a predetermined number or more, but the present invention is not limited to this.

For example, the area crowding condition may be that the number of groups in an event occurrence area is a predetermined number or more (such as three or more).

Also, for example, a nearby area may be set up outside the event occurrence area, and the area crowding condition may be that the total number of users within the event occurrence area and the nearby area (this may be considered to be the number of users within the nearby area including the users within the event occurrence area) is at or above a predetermined number (such as 40 or more). In this case, for some of the users for whom an event occurrence area that meets the area crowding condition has been set up in the game field, the event occurrence area that meets the area crowding condition may be canceled and another event occurrence area set up, whereas for the rest of the users, there may be no cancelation, with the setting of the event occurrence area that meets the area crowding condition left as is. The setting of the event occurrence area may be maintained by giving priority to users who are closer to the event occurrence area, such as users within the event occurrence area.

Setting Up Another Event Occurrence Area

In the first embodiment above, when a friend user associated with the user participates in an event in an event occurrence area that meets the area crowding condition (when the setting of the event occurrence area of the friend user is maintained), as an exception to the processing of step 15 shown in FIG. 12, an event occurrence area set for that user's game field that meets the area crowding condition may not be canceled, and the setting may be maintained as is. This makes it possible for friends to belong to the same group and participate in an event, and the social aspect of a location-based game can thus be enhanced.

In the first embodiment above, in the processing of step S14 shown in FIG. 12, the area control unit 201 of the server device 20 may set up not just one event occurrence area, but two or more of them when setting up another event occurrence area at a location different from the location in the virtual game space in which the event occurrence area that meets the area crowding condition has been set up. In this case, two or more other event occurrence areas are set up in association with the correspondence information included in the event occurrence area information shown in FIG. 8. Thus, users who are moving toward an event occurrence area as a destination can be more effectively distributed.

Also, in the first embodiment above, the processing of step S14 shown in FIG. 12 may be omitted. That is, in updating the game field information included in the user information shown in FIG. 6, the area control unit 201 of the server device 20 may cancel only an event occurrence area that meets the area crowding condition without setting up any additional information related to other event occurrence areas in that user's game field. This prevents additional users from gathering in an event occurrence area that has become overcrowded (effectively restricts event participation in an event occurrence area that has become overcrowded), so users who are already participating in an event in the event occurrence area that became overcrowded will not be subjected to any further overcrowding and, although the overcrowding will not be resolved, they will be able to play in a relatively pleasant environment.

Updating Correspondence Information

In the first embodiment above, an example was given in which correspondence information was preset for each of a plurality of event occurrence areas set up in the event occurrence area information shown in FIG. 8, but the present invention is not limited to this. For example, the area control unit 201 of the server device 20 may, periodically or at predetermined intervals, determine the crowding state for all of the multiple event occurrence areas set up in the event occurrence area information shown in FIG. 8 based on each set of participation status information, update the correspondence information included in the event occurrence area information shown in FIG. 8 only for those event occurrence areas determined to be in a crowded state, and set another new event occurrence area in association with those event occurrence areas. More specifically, when an event occurrence area determined to be in a crowded state is specified, another event occurrence area is generated at an arbitrary location within a predetermined range from the location in the virtual game space in which that event occurrence area has been set up (such as within a radius of 500 meters centered on a location in the event occurrence area), and this is additionally set up in the event occurrence area information shown in FIG. 8 in association with the new event occurrence area ID. Then, the correspondence information of the event occurrence area information shown in FIG. 8 is updated, and this new event occurrence area is set up in association with the event occurrence area determined to be in a crowded state.

Individual Generation of Other Event Occurrence Areas

In the first embodiment above, an example was given in which the correspondence information included in the event occurrence area information shown in FIG. 8 was used to additionally set up another event occurrence area in each user's game field, but it is also possible to individually generate and additionally set up another event occurrence area in each user's game field without using this correspondence information.

For example, in the processing of step S14 shown in FIG. 12, the area control unit 201 of the server device 20 uses a specific algorithm to uniquely establish a location in the virtual game space of another event occurrence area in addition to a location in the virtual game space of an event occurrence area that meets the area crowding condition. As a result, one other event occurrence area is set up within a predetermined range from a location in the virtual game space in which the event occurrence area that meets the area crowding condition has been set up (such as within a radius of 500 meters centered on a location in the event occurrence area that meets the area crowding condition). Consequently, the same additional event occurrence area is generated and uniquely set not only for that user but also for other users who also had set the event occurrence area that meets the area crowding condition as a destination, and this becomes a new destination. Thus, limiting the location of another event occurrence area to a short distance from the event occurrence area that meets the area crowding condition also limits the distance that the users actually move in real space toward the new destination. Consequently, users can be encouraged to change their destination from an event occurrence area that became overcrowded to another event occurrence area.

Event Characters, etc., in Other Event Occurrence Areas

In the first embodiment above, as shown in FIG. 8, an example was given in which the same event characters, rewards, etc., were granted to other event occurrence areas set up in addition to an event occurrence area whose setting has been canceled, but the present invention is not limited to this. For example, the correspondence information of the event occurrence information shown in FIG. 8 may be set so that the event characters, rewards, etc., are different from those in an event occurrence area whose setting has been canceled. The result of this is that users have a chance to acquire event characters, rewards, etc., that are different from those in the event occurrence area that was their original destination, so users who are moving toward an event occurrence area as a destination can be effectively distributed.

Preferential Treatment

In the first embodiment above, in the processing of step S14 shown in FIG. 12, when two or more other event occurrence areas are set up at locations different from the location in the virtual game space where an event occurrence area that meets the area crowding condition was set up, the event control unit 203 of the server device 20 may execute processing to give preferential treatment to users participating in an event in another event occurrence area that satisfies a preferential treatment condition among the plurality of other event occurrence areas that have been set up. This preferential treatment condition may be, for example, participation in an event in another event occurrence area with the lowest area head count, or participation in an event in another event occurrence area with the lowest event participant head count. The processing to give preferential treatment to a user may be, for example, improving the quality of an event reward or increasing the amount of an event reward. Consequently, users who are moving toward an event occurrence area as a destination can be more effectively distributed by encouraging them to change their destination to another event occurrence area.

Groups

In the first embodiment above, as an exception to the processing of step S33 shown in FIG. 13, when the event control unit 203 of the server device 20 determines that the number of users in an event occurrence area is not enough to form a group consisting of a predetermined number of users, a group may be created by supplementing those users with users from outside the event occurrence area. For example, if a group cannot be created because there are not enough users in an event occurrence area, a group may be created by supplementing those users with users who have changed their destination to another event occurrence area. Thus, the social aspect of a location-based game can be enhanced. In this case, groups may be created that have an equal number of participants regardless of the location of those participants. Also, users outside the event occurrence area are preferably located in another event occurrence area in which the same event characters are set as those in the first event occurrence area.

In the first embodiment above, in the processing of step S33 shown in FIG. 13, even if the event control unit 203 of the server device 20 determines that a group consisting of a predetermined number of users can be formed by combining users in an event occurrence area, a user located outside that event occurrence area who has a friend relationship with one of the users in the group (such as a friend user who changed their destination to another event occurrence area) may be added to that same group. In this case, the number of members in a group may be permitted to exceed the cap. Thus, the social aspect of a location-based game can be enhanced.

Also, in the first embodiment above, if a friend user associated with a user is already participating in an event with participation restrictions, a group may be formed so that the user may be included in the same group as the friend user, as an exception in the processing of step 33 shown in FIG. 13. In this case, the number of members in a group may be permitted to exceed the cap. Thus, the social aspect of a location-based game can be enhanced.

In the first embodiment above, the type of group may be an open group formed by freely combining a plurality of users located in the same event occurrence area, a private group formed by combining only specific users by setting a password, etc., among a plurality of users located in the same event occurrence area, or the like. Also, in order to prevent crowding, an upper limit may be set to the number of users who can participate in an event in one event occurrence area, or on the number of users in one group. For instance, the upper limit for the number of participants in an event in one event occurrence area may be 20, and the upper limit for the number of participants in one group may be 10.

Other

In the first embodiment described above, the area control unit 201 of the server device 20 may send a notification about another event occurrence area to users participating in an event in an event occurrence area that meets the area crowding condition, in the event that another event occurrence area has been set up at a location different from the location in the virtual game space where the event occurrence area that meets the area crowding condition was set up. This proactively prompts users in an area that is starting to become overcrowded to move to another area to relieve the crowding.

Then, if an event participant who has received this notification leaves the event and actually moves in real space toward another event occurrence area as a destination, the event control unit 203 of the server device 20 may execute preferential treatment (granting items, returning participation rights, auto battle, etc.) for that user when the user participates in an event in another event occurrence area.

Also, an event participant who has received this notification may be allowed to actually move in real space toward another event occurrence area as a destination while continuing that event. In this case, in order to continue the event, auto battle may be used while moving.

Also, in the first embodiment above, when the area control unit 201 of the server device 20 has set up two or more other event occurrence areas at locations different from the location in the virtual game space where the event occurrence area that meets the area crowding condition was set up, priority may be given to sending a notification related to the other event occurrence area with the lowest area head count, or priority may be given to sending a notification related to the other event occurrence area with the lowest event participant head count, or priority may be given to sending a notification related to other event occurrence areas in which a friend user is participating in the event. The order of priority for these notifications may be set by a user operation. This allows the user to receive notifications in the order of priority desired by the user.

Also, the first embodiment above involved a location-based game in which, when a user holding the client terminal 10 moved in real space, the location in the virtual game space corresponding to the user's location in real space was specified, and movement in real space was reflected in the virtual game space, but the present invention can also be applied to other location-based games.

For example, the present invention may be applied to a game in which a user can participate in an event featuring the user's location in real space by having a character in the virtual game space move to an event occurrence area according to a user input operation. More specifically, this is a game in which, when the user moves a character to an event occurrence area (a town, building, field, etc.), the user can participate in the event, and in that event the user is instructed to move to a specified location in real space (train station X, etc.), and a reward is granted when the user's location information moves to a specified location. Also, when the present invention is applied to such a game, the location data in the virtual game space and the location data in real space in the location information of the event occurrence area information need not be in one-to-one correspondence, and may instead be in a one-to-many correspondence (that is, a plurality of sets of location data in real space may be provided for one set of location data in the virtual game space). In this case, when a certain set of location data out of the plurality of sets of location data in real space is determined to be in a crowded state, another set of location data that is not in a crowded state may be used to issue an instruction to the user. This crowded state may be determined by referring to the event participant head count, the number of users located in a set of location data in real space, or the like.

Second Embodiment

Next, an information processing device, a recording medium, and an information processing system according to a second embodiment of the present invention will be described in detail. The system configuration and hardware configuration according to the second embodiment are the same as those in the first embodiment above.

Software Configuration

Server Device

The server device 20 according to the second embodiment is realized by the functional blocks shown in FIG. 4, for example, just as with the server device 20 according to the first embodiment. That is, the server control unit 200 according to the second embodiment includes the area control unit 201, the crowding determination unit 202, and the event control unit 203.

The area control unit 201 performs control related to an event occurrence area in which events are generated in a location-based game. The crowding determination unit 202 determines whether the event occurrence area is in a crowded state (overcrowded state). The event control unit 203 performs overall control related to events in a location-based game. The event control unit 203 in this embodiment, for example, may count the number of users who have entered an event occurrence area, the number of users participating in the event among the users in the area, and so forth, and updates the participation status information for that event occurrence area.

The server storage unit 220 includes a character information storage unit 221, a user information storage unit 222, and an event information storage unit 223. The character information storage unit 221 is an example of a content information storage unit, and stores character information (content information) related to characters, as an example of content. The user information storage unit 222 stores user information related to the users who play a location-based game. The event information storage unit 223 stores event information related to the events of a location-based game.

In the second embodiment, unlike the first embodiment, the event occurrence area information stored in the event information storage unit 223 is made up of the various data shown below. In an event in this embodiment, a game can be played in which characters that appear in each of the plurality of event occurrence areas set in the game field can be acquired.

FIG. 14 is a configuration diagram showing an example of event occurrence area information. The event occurrence area information shown in FIG. 14 has categories such as event occurrence area ID, location information, event characters, and participation status information. Event occurrence area ID is information for uniquely identifying an event occurrence area. Location information is information for specifying the location of an event occurrence area in real space or virtual game space. For example, it is location data for the two-dimensional coordinate system of the virtual game space in which an event occurrence area is disposed, or location data such as the latitude and longitude of the corresponding real space. The event occurrence area has a region of a certain range based on this location data (such as a radius of 20 meters centered on that location). Event characters is information indicating a character used in an event. In this embodiment, one of a plurality of characters set in the character information stored in the character information storage unit 221 is set as an event character that appears in the event occurrence area that can be acquired. Participation status information is information related to the participation status in an event of users in an event occurrence area. In this embodiment, this includes the number of users in an event occurrence area (area head count) and their user IDs, the number of users participating in the event among the users in the area (such as users who are playing an event game) and their user IDs, the number of users who are not participating in the event, such as the users who have cleared the event game, or users who are not playing the event game in the first place (event non-participation head count), and their user IDs, and the like. This participation status information fluctuates as users enter and exit the event occurrence area and participate in and leave an event.

Client Terminal

The client terminal 10 according to the second embodiment is realized by the functional blocks shown in FIG. 9, for example, just as with the client terminal 10 according to the first embodiment. That is, the client control unit 100 according to the second embodiment includes a data acquisition unit 101, a game control unit 102, a server access unit 103, and a display control unit 104.

In the second embodiment, unlike the first embodiment, the data acquisition unit 101 also has the following function in addition to the function of acquiring the data required to specify the user's location in real space.

The data acquisition unit 101 acquires data required to specify the event occurrence area in real space. The data acquisition unit 101 in this embodiment uses the camera unit 70 to capture an image of a game information code (such as a QR code (registered trademark)) associated with an event occurrence area to acquire information for specifying that event occurrence area. The game information code in this embodiment may be pasted, for example, on the walls of shops, sightseeing spots, etc., in each event occurrence area.

System Overview

An overview of the system in the second embodiment will now be described. The system in this embodiment provides a location-based game to the user. A location-based game is a game in which, when the user holding the client terminal 10 moves in real space, the location in the virtual game space corresponding to the user's location in real space is specified, and movement in real space is reflected in the virtual game space.

With the location-based game of this embodiment, an event occurrence area, which is an area where an event occurs, is set up in the virtual game space during the event period. That is, the event occurrence area is set up at a location in real space corresponding to the location in the virtual game space. A user who actually moves in real space toward an event occurrence area as a destination and enters the event occurrence area can participate in an event in that event occurrence area (that is, can play the event game in the event occurrence area).

The event in this embodiment is an event game for acquiring characters appearing in each of a plurality of event occurrence areas set up in a game field. Each event occurrence area has a special character that is limited to that event, and users who enter one of the event occurrence areas can play an event game by looking for an event guide in that area and reading a game information code with the camera of the client terminal 10. Once an event game is cleared, that special character can be acquired. Once the user holding the client terminal 10 actually moves in real space, steadily goes from one event occurrence area to the next, and acquires a predetermined number of characters (such as three characters), a reward will be finally granted (for example, a photo frame in which the user can take a picture together with the acquired characters).

Figure 15:
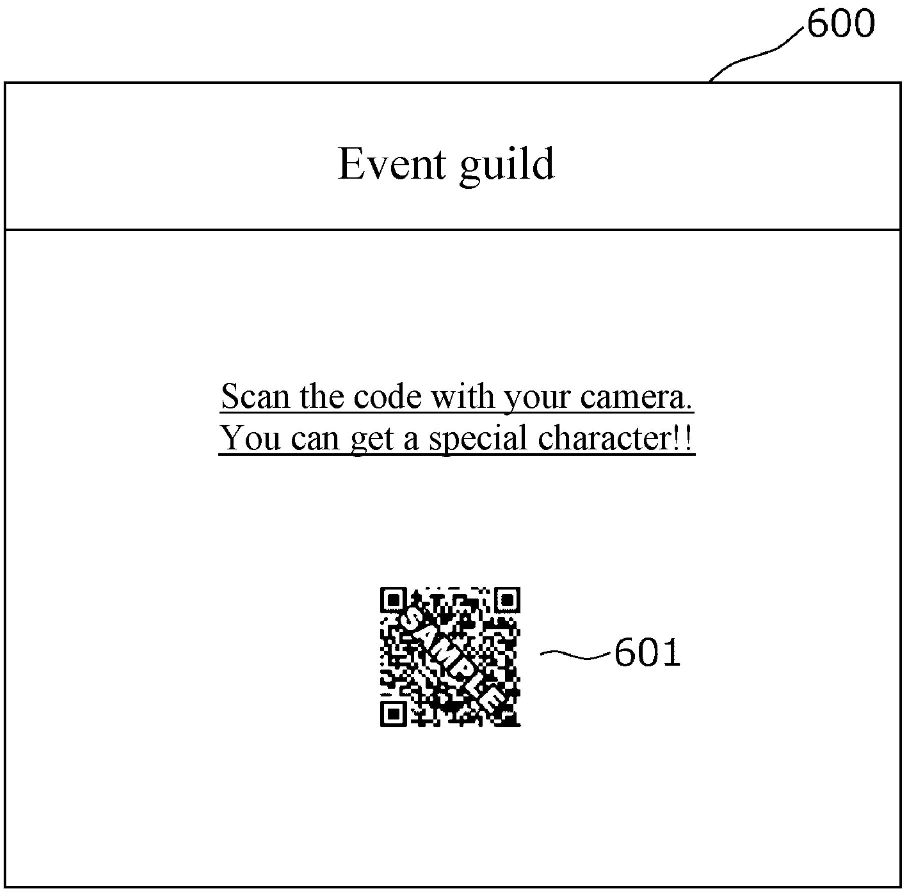
FIG. 15 is a conceptual diagram showing an example of an event guide.

FIG. 15 is a conceptual diagram showing an example of an event guide. A game information code 601 is displayed on the event guide 600 shown in FIG. 15. In this embodiment, a user who enters an event occurrence area uses a camera unit 70 of the client terminal 10 to capture an image of the game information code 601 in order to acquire a special character that appears in that event occurrence area.

Thus, when an event occurrence area is set up in the virtual game space, many users may actually move in real space toward the event occurrence area as a destination, so there is a risk that the area may become overcrowded by the users gathered there. If overcrowding occurs in the event occurrence area, the users will have to play in an unpleasant environment, and there is also a risk of spreading infectious disease.

In view of this, in the location-based game in this embodiment, among the event occurrence areas located at different locations from the location at which the event occurrence area that was the previous destination was set up (hereinafter also referred to as the "previous event occurrence area"), an event occurrence area that is less likely to become overcrowded is specified and is set as the next destination. Consequently, users who are moving toward an event occurrence area as a destination can be distributed, which makes it less likely that the area will become overcrowded, and thus makes it possible to provide the users with a pleasant playing environment.

System Operation

Figure 16:
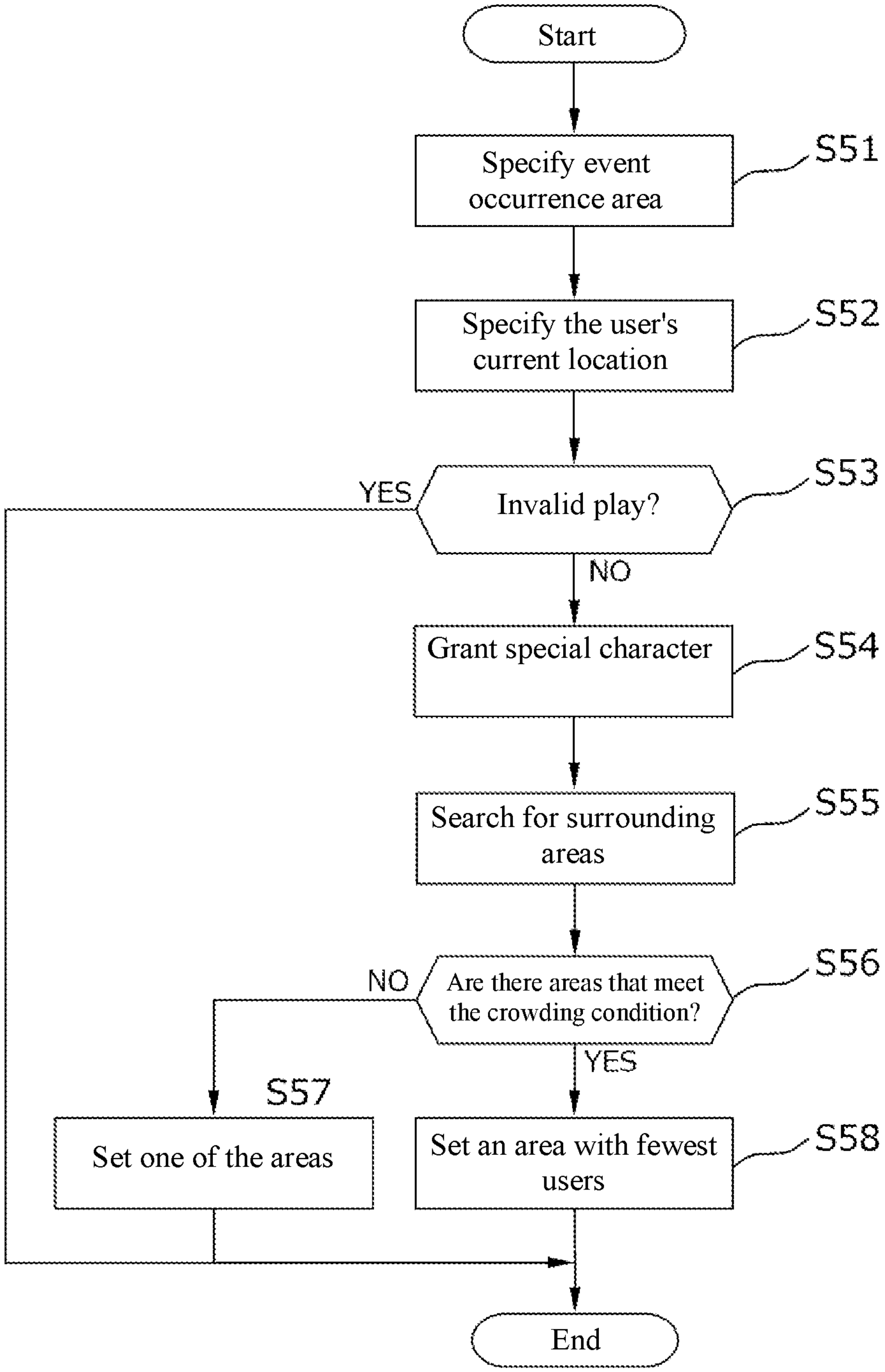
FIG. 16 is a flowchart illustrating an operation example related to an event in an event occurrence area in a second embodiment.

FIG. 16 is a flowchart illustrating an operation example related to an event in an event occurrence area in the second embodiment. A game in which special characters that appear in a plurality of event occurrence areas can be acquired will be described below.

After the game application has been activated, the data acquisition unit 101 of the client terminal 10 uses the camera unit 70 to acquire information such as the event occurrence area ID by reading the game information code disposed in the event occurrence area. Then, the server access unit 103 of the client terminal 10 sends the information acquired by the data acquisition unit 101 to the server device 20 along with the user ID.

Upon receiving the information sent from the client terminal 10 along with the user ID, the event control unit 203 of the server device 20 refers to the game field information included in the user information shown in FIG. 6 and to the location information included in the event occurrence area information shown in FIG. 14, and specifies the location in the virtual game space of the event occurrence area in which the game information code is disposed (step S51).

Next, after the game application has been activated, the data acquisition unit 101 of the client terminal 10 acquires the user's location information (latitude and longitude) in real space by detecting radio waves from GPS satellites with the GPS unit 69. Then, the server access unit 103 of the client terminal 10 sends the location information acquired by the data acquisition unit 101 to the server device 20 along with the user ID.

Upon receiving the location information sent from the client terminal 10 along with the user ID, the event control unit 203 of the server device 20 refers to the game field information included in the user information shown in FIG. 6 and specifies the location (current location) in the virtual game space corresponding to the user's location in real space.

Next, the event control unit 203 of the server device 20 compares the specified location of this event occurrence area and the specified user's current location, and determines whether the game play is invalid based on whether the distance between the two is within a predetermined range (such as within 10 meters) (step S53). In other words, it is determined whether the user has actually moved in real space, gone to the location of the event occurrence area, and read the information code at that location.

Then, if the game play is determined to be invalid ("Yes" in step S53), the event control unit 203 of the server device 20 presumes that the user did not actually move in real space and has instead read an information code procured somewhere else, and ends this processing (invalid play). On the other hand, if the game play is determined not to be invalid ("No" in step S53), the user is counted as a valid event participant, the participation status information is updated, and the processing proceeds to step S54.

Next, if the game play is determined not to be invalid, the event control unit 203 of the server device 20 refers to the event occurrence area information shown in FIG. 14, specifies an event character associated with that event occurrence area as a special character that has appeared in that event occurrence area, and requests the client terminal 10 held by the user to start an event game for earning that special character. Upon receiving this request from the server device 20, the game control unit 102 of the client terminal 10 starts the event game according to the user's game operation, and awards that special character once the game is cleared (step S54). Then, the possessed character information included in the user information shown in FIG. 6 is updated, and the special character acquired by the user in that event occurrence area is additionally set up.

Next, just as in step S51 above, when the location of the event occurrence area where the user acquired a special character (that is, the previous event occurrence area) is specified, the area control unit 201 of the server device 20 searches for surrounding event occurrence areas located within a predetermined range from the previous event occurrence area (such as within a radius of 2 km centered on the previous event occurrence area) among the event occurrence areas set up in the game field information included in the user information shown in FIG. 6 (that is, surrounding event occurrence areas located at different locations from the location of the previous event occurrence area) (step S55).

Next, if the search results yield hits for one or more surrounding event occurrence areas in the user's game field, the area control unit 201 of the server device 20 requests the crowding determination unit 202 to execute determination processing to find whether the event occurrence areas that yielded hits include any event occurrence areas that meet an area crowding condition, which is a condition for inferring whether an event occurrence area is in a crowded state. Upon receiving this request, the crowding determination unit 202 of the server device 20 refers to the participation status information included in the event occurrence area information shown in FIG. 14 and determines whether the surrounding event occurrence areas that yielded hits meet the area crowding condition (step S56). Any condition can be set as this area crowding condition as long as it is a condition for inferring that an event occurrence area is in a crowded state.

For example, the area crowding condition may be that, among the users located in an event occurrence area, at least a predetermined number of them (such as 20 or more) are participating in an event. In this case, the area control unit 201 of the server device 20 refers to the event participant head count included in the participation status information and determines whether the event occurrence area is in a crowded state. Consequently, overcrowding can be ascertained based on the number of users gathered in the event occurrence area who are actually participating in the event, so the users gathered there can be distributed properly.

Also, for example, the area crowding condition may be that the number of users located in the event occurrence area is at least a predetermined number (such as 40 or more). In this case, the area control unit 201 of the server device 20 refers to the area head count included in the participation status information and determines whether the event occurrence area is in a crowded state. Consequently, overcrowding can be ascertained based on the number of users gathered in an event occurrence area, regardless of whether they are participating in an event or not, so the users can be distributed more proactively.

If there is an event occurrence area that meets the area crowding condition ("Yes" in step S56), the area control unit 201 of the server device 20 proceeds to the processing in step S58 (discussed below). On the other hand, if there is no event occurrence area that meets the area crowding condition ("No" in step S56), the processing proceeds to step S57.

If there is no event occurrence area that meets the area crowding condition (that is, if none of the surrounding event occurrence areas is in a crowded state), the area control unit 201 of the server device 20 updates the game field information included in the user information shown in FIG. 6 and sets up one of the surrounding event occurrence areas that yielded hits as the event occurrence area that will be the user's next destination (step S57).

Also, if there is an event occurrence area that meets the area crowding condition (that is, if at least one of the surrounding event occurrence areas is in a crowded state), the area control unit 201 of the server device 20 refers to the participation status information included in the event occurrence area information shown in FIG. 14, compares the event participant head count in each of the surrounding event occurrence areas, and specifies the event occurrence area with the fewest participants. Then, it updates the game field information included in the user information shown in FIG. 6 and sets up the specified event occurrence area as the event occurrence area that will be the user's next destination (step S58).

For example, if there are two surrounding event occurrence areas that yielded hits, and if one of these event occurrence areas meets the area crowding condition and one does not meet the area crowding condition, then the event occurrence area in which the area crowding condition is not met is set up as the event occurrence area that is the user's next destination. Also, for example, if there are two surrounding event occurrence areas that yielded hits and if both are event occurrence areas that meet the area crowding condition, the event occurrence area with the lower event participant head count is set up as the event occurrence area that will be the user's next destination.

Thus, in the user's game field, among the surrounding event occurrence areas located at different locations from the previous event occurrence area, an event occurrence area in which the area crowding condition is not met or an event occurrence area with the lowest event participant head count, even if an area crowding condition is met, is set up as the next destination. Accordingly, users can be effectively guided to an event occurrence area where it is less likely that the area will become overcrowded and users who are moving toward an event occurrence area as a destination can be effectively distributed.

Modification Examples

Information Code

In the above embodiments, the information code is not limited to the QR code (registered trademark) that was used as an example of a two-dimensional code. For instance, it may be a maxi code, a berry code, a data matrix code, a bar code, or the like.

Specification of Event Occurrence Area

In the above embodiments, an example was given in which a game information code associated with an event occurrence area was captured by the camera unit 70 to acquire information for specifying that event occurrence area, but information for specifying an event occurrence area may instead be acquired, for example, by receiving a beacon transmitted from a specified location associated with that event occurrence area.

Other Event Occurrence Area That Will Be the Next Destination

In the above embodiments, an example was given in which an event occurrence area was set up as the next destination according to an area crowding condition, but since an event occurrence area that has frequently been set up as the destination of other users is presumed to have a high probability of becoming overcrowded, event occurrence areas may be set up in consideration of other users' guidance situations. For example, when sequentially setting the destination of each user, the area control unit 201 of the server device 20 may perform control so that the event occurrence area set as the destination for a previous user will not be set as the destination for the next user.

Game Field Screen

In the described embodiments, when an event occurrence area is set that will be the user's next destination, the display control unit 104 of the client terminal 10 can also display a game field screen that includes the event occurrence area set as the next destination. This makes it easier to guide the user to that event occurrence area. It is also possible to display a game field screen that includes a hint related to the event occurrence area set as the next destination. For example, if the location of the event occurrence area that is the destination is set to the location of a bookstore, a hint such as "I'm getting a whiff of a character who loves books" is displayed on the game field screen in order to guide the user to that bookstore. This piques a user's interest while guiding that user to the event occurrence area. Also, in so doing, the degree of difficulty of the hint may be varied depending on how crowded the event occurrence area is. For example, if the degree of crowding is high (if area head count is large, if the event participant head count is large, etc.), a hint with a high degree of difficulty may be displayed on the game field screen in order to delay the arrival of users at the event area as much as possible.

Update of Participation Status Information

In the above embodiments, the event control unit 203 of the server device 20 may determine whether a user has entered an event occurrence area on the condition that the game information code associated with the event occurrence area set as the user's destination has been read, and may increase the area head count in that event occurrence area. Also, it may be determined that a user has entered an event occurrence area on the condition that the user's current location in real space is within the event occurrence area set as the user's destination.

In the above embodiments, the event control unit 203 of the server device 20 may determine that a user has left the previous event occurrence area on the condition that the event occurrence area that will be the user's next destination has been set up, and may reduce the area head count in the previous event occurrence area. Also, it may be determined that a user has left the event occurrence area on the condition that the user's current location in real space is outside the event occurrence area set as that user's destination. Also, it may be determined that a user has left the previous event occurrence area on the condition that the game information code associated with the event occurrence area set as the user's next destination has been read.

Also, in the above embodiments, the event control unit 203 of the server device 20 may determine that a user is participating in an event on the condition that the game information code associated with the event occurrence area set as the user's destination has been read, and may increase the event participant head count in the event occurrence area. Also, it may be determined that a user is participating in an event on the condition that the user has performed an operation to start an event game in that event occurrence area. Also, it may be determined that a user is not participating in an event (has left the event) on the condition that the user has cleared the event game, and the event participant head count in the event occurrence area may be reduced. Also, it may be determined that the user is not participating in an event (has left the event) on the condition that the user has acquired a character.

Other Embodiments

The above embodiments are intended to facilitate an understanding of the present invention and should not be interpreted as limiting the present invention. The present invention can be modified and improved without departing from the gist thereof, and the present invention also includes equivalents thereof. In particular, the embodiments described below are also included in the invention.

Selection of Play Mode

In the above embodiments, the play mode of a location-based game (the range for searching for event occurrence areas) may be set by user operation. For instance, if a location-based game can be played within a specific facility, a play mode in which play takes place in the entire specific facility (a play mode that searches for event occurrence areas on all floors) and play mode in which play takes place only on a specific floor of the specific facility (a play mode that searches for event occurrence areas only on a specific floor) can be set by user operation.

Event Game

In the above embodiments, the event game may be a competition game such as a rock-paper-scissors game in which users compete against opponents. It may also be a quiz game based on information about the event occurrence area. For instance, if the location of the event occurrence area is set to the location of a store, questions related to the name of the store, merchandise, company information, or the like may be asked as a quiz. This will likely have a promotional effect on users who visit the event occurrence area.

Content

In the embodiments described above, content is not limited to characters. For example, it may be items, cards, figures, avatars, or the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . information processing system, 10 . . . client terminal, 20 . . . server device, 50 . . . computer, 51 . . . CPU, 52 . . . RAM, 53 . . . ROM, 54 . . . communication interface, 55 . . . input device, 56 . . . display device, 57 . . . external interface, 58 . . . HDD, 60 . . . computer, 61 . . . CPU, 62 . . . RAM, 63 . . . ROM, 64 . . . communication interface, 65 . . . input device, 66 . . . display device, 67 . . . external interface, 68 . . . HDD, 69 . . . GPS unit, 70 . . . camera unit, 100 . . . client control unit, 101 . . . data acquisition unit, 102 . . . game control unit, 103 . . . server access unit, 104 . . . display control unit, 120 . . . client storage unit, 140 . . . client communication unit, 150 . . . operation input reception unit, 160 . . . screen display unit, 200 . . . server control unit, 201 . . . area control unit, 202 . . . crowding determination unit, 203 . . . event control unit, 220 . . . server storage unit, 221 . . . character information storage unit, 222 . . . user information storage unit, 223 . . . event information storage unit, 240 . . . server communication unit, 500 . . . game field screen, 501 . . . game field, 502 . . . user character, 503 . . . mark, 504 . . . mark, 600 . . . event guide, 601 . . . information code, B . . . bus line, N . . . network

What is claimed is:

1. An information processing device that communicates a terminal device comprising a GPS sensor and a camera and causes the terminal device to execute a game, the information processing device comprising:

a storage; and a controller that:

sets up an event occurrence area at a predetermined location in a virtual game space, and associates the event occurrence area with an area in a real space, identifies a current location of the terminal device in the real space based on location information acquired by the GPS sensor, detects a current state of the area in the real space based on image data captured by the camera, detects a user participation status in the event occurrence area based on the current state of the area in the real space, stores, in the storage, participation status information indicating the user participation status in the event occurrence area, detects whether the event occurrence area is in a crowded state based on the participation status information, after detecting that the event occurrence area is in the crowded state, restricts participation to the event occurrence area in the virtual game space, and sets up another event occurrence area in the virtual game space to be associated with another area in the real space, and upon setting up the other event occurrence area in the virtual game space, based on signals from the GPS sensor and the camera of the terminal device, causes a display of the terminal device to display a field map of the virtual game space distinguishably indicating of a location of the other event occurrence area from the event occurrence area in the crowded state.

2. The information processing device according to claim 1, wherein the other event occurrence area is an area in which the user can obtain a same reward as a reward that can be obtained in the event occurrence area.

3. The information processing device according to claim 1, wherein the controller restricts the participation by preventing the user who does not participate an event from participating to the event occurrence area.

4. The information processing device according to claim 1, wherein the participation status information stored in the storage includes a participant head count indicating a number of users participating in the event in the event occurrence area, and the controller detects whether the event occurrence area is in the crowded state by detecting whether the participant head count has reached a predetermined number.

5. The information processing device according to claim 1, wherein the participation status information stored in the storage includes an area head count indicating a number of users in the event occurrence area, and the controller detects whether the event occurrence area is in the crowded state by detecting whether the area head count has reached a predetermined number.

6. The information processing device according to claim 1, wherein the controller sets up the other event occurrence area within a predetermined range from a location in the virtual game space at which the event occurrence area in the crowded state has been set up.

7. The information processing device according to claim 1, wherein after detecting that the event occurrence area is in the crowded state, the controller:

sets up, in the virtual game space, other event occurrence areas different from the event occurrence area in the crowded state, and executes a processing to give preferential treatment to the user who participates in an event in another event occurrence area that satisfies a preferential treatment condition, among the other event occurrence areas that are set up.

8. A non-transitory computer readable recording medium storing instructions for an information processing device that communicates a terminal device comprising a GPS sensor and a camera and causes the terminal device to execute a game, the instructions causing a computer to execute:

setting up an event occurrence area at a predetermined location in a virtual game space, and associating the event occurrence area with an area in a real space;

identifying a current location of the terminal device in the real space based on location information acquired by the GPS sensor;

detecting a current state of the area in the real space based on image data captured by the camera;

detecting a user participation status in the event occurrence area based on the current state of the area in the real space;

storing, in a storage, participation status information indicating the user participation status in the event occurrence area;

detecting whether the event occurrence area is in a crowded state based on the participation status information;

after detecting that the event occurrence area is in the crowded state, restricting participation to the event occurrence area in the virtual game space, and setting up another event occurrence area in the virtual game space to be associated with another area in the real space; and upon setting up the other event occurrence area in the virtual game space, based on signals from the GPS sensor and the camera of the terminal device, causing a display of the terminal device to display a field map of the virtual game space distinguishably indicating of a location of the other event occurrence area from the event occurrence area in the crowded state.

9. The information processing device according to claim 2, wherein upon detecting game information code that has been captured by the camera from an even guide settled at the other event occurrence area, the controller gives to the user, as the reward via the terminal device, a special character that appears in the other event occurrence area.

* * * * *